(12) United States Patent
Moriya et al.

(10) Patent No.: US 10,252,453 B2
(45) Date of Patent: Apr. 9, 2019

(54) RESIN MOLDED ARTICLE, METHOD FOR MANUFACTURING THE SAME, AND PRINTER

(71) Applicant: CANON KABUSHIKI KAISHA, Tokyo (JP)

(72) Inventors: Yuta Moriya, Chigasaki (JP); Akira Nishi, Kawasaki (JP); Koki Kodaira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 15/413,026

(22) Filed: Jan. 23, 2017

(65) Prior Publication Data

US 2017/0129150 A1     May 11, 2017

Related U.S. Application Data

(63) Continuation of application No. 13/324,593, filed on Dec. 13, 2011.

(30) Foreign Application Priority Data

Dec. 15, 2010 (JP) ................................. 2010-279880
Nov. 1, 2011 (JP) ................................. 2011-240453

(51) Int. Cl.
| | | |
|---|---|---|
| *B32B 3/00* | (2006.01) | |
| *B29C 45/37* | (2006.01) | |
| *B29C 45/00* | (2006.01) | |
| *B29C 45/26* | (2006.01) | |
| *B41J 29/02* | (2006.01) | |

(Continued)

(52) U.S. Cl.
CPC ........ *B29C 45/372* (2013.01); *B29C 45/0025* (2013.01); *B29C 45/2624* (2013.01); *B41J 29/02* (2013.01); *B29L 2031/767* (2013.01); *B32B 3/30* (2013.01); *Y10T 428/24355* (2015.01); *Y10T 428/24479* (2015.01)

(58) Field of Classification Search
CPC ....... B32B 3/00; B32B 3/30; B29L 2031/767; Y10T 428/24355; Y10T 428/24479; B29C 45/372; B29C 45/37; B29C 45/2624; B29C 45/0025; B41J 29/02
See application file for complete search history.

(56) References Cited

U.S. PATENT DOCUMENTS 5,723,794 A * 3/1998 Discenzo ................ G01L 1/241
                                                     73/800
6,470,610 B1* 10/2002 Northey ................. G02B 5/124
                                                     359/530

(Continued)

FOREIGN PATENT DOCUMENTS

| JP | S6127228 A | 2/1986 |
|---|---|---|
| JP | H10296797 A | 11/1998 |

(Continued)

*Primary Examiner* — Donald J Loney
(74) *Attorney, Agent, or Firm* — Canon U.S.A., Inc. IP Division

(57) ABSTRACT

A molded article has an exterior surface, a non-exterior surface, and a projecting or recessed portion provided on at least one of the exterior surface and the non-exterior surface. A repeated pattern of projections and/or recesses or a texture face, which serves to disturb the flow of resin, is provided on the non-exterior surface.

17 Claims, 21 Drawing Sheets

(51) Int. Cl.
  *B32B 3/30* (2006.01)
  *B29L 31/00* (2006.01)

(56) References Cited

U.S. PATENT DOCUMENTS 7,303,807 B2 * 12/2007 Ikeda ..................... B29C 45/16
                                                  428/172
2006/0083880 A1    4/2006 Hirose
2007/0200318 A1 *  8/2007 Kamiya ............... B60R 21/2165
                                                  280/728.3

FOREIGN PATENT DOCUMENTS

JP    2000280303 A    10/2000
JP    2009045918 A     3/2009

* cited by examiner

RESIN MOLDED ARTICLE, METHOD FOR MANUFACTURING THE SAME, AND PRINTER

CROSS REFERENCE TO RELATED APPLICATIONS

The present application is a continuation of U.S. patent application Ser. No. 13/324,593, filed Dec. 13, 2011, entitled "RESIN MOLDED ARTICLE, METHOD FOR MANUFACTURING THE SAME, AND PRINTER", the content of which is expressly incorporated by reference herein in its entirety. Further, the present continuation application claims priority from Japanese Patent Application Nos. 2010-279880 filed Dec. 15, 2010 and No. 2011-240453 filed Nov. 1, 2011, which are also hereby incorporated by reference herein in their entirety.

BACKGROUND OF THE INVENTION

Field of the Invention

The present invention relates to plate-shaped or box-shaped resin molded articles. More specifically, the present invention relates to a plate-shaped or box-shaped resin molded article which is formed by injection molding and required to have a good appearance.

Description of the Related Art

An example of a plate-shaped or box-shaped resin molded article includes various projecting or recessed portions. For example, a projecting or recessed portion such as a rib-shaped projecting portion for reinforcing or positioning the resin molded article or a stepped portion formed by an ejector pin may be formed on a non-exterior surface of the resin molded article. In addition, a projecting or recessed portion such as an arrow-shaped portion for introducing a product function to the user may be formed on an exterior surface of the molded article.

Here, the exterior surface is a surface that is visible to the user and therefore required to have a good appearance, and the non-exterior surface is a surface at the side opposite to the exterior surface.

In an injection molding process, resin is injected into a cavity of a mold through an injection gate. The flow of the resin is disturbed at the above-described projecting or recessed portion. Accordingly, there is a possibility that a non-uniform section, which is a section having a color different from that of other sections, will be formed in the exterior surface at a position corresponding to the projecting or recessed portion on the non-exterior surface, or at a position near the projecting or recessed portion on the exterior surface.

Japanese Patent Laid-Open No. 2001-277303 proposes a technique for reducing the occurrence of color difference on the exterior surface, in particular, jetting. More specifically, a molding method is proposed which uses a mold in which a resin-flow-velocity reducing portion having a projecting or recessed shape is formed in a cavity for forming a non-exterior surface at a position where the resin flow velocity tends to increase.

According to the method described in Japanese Patent Laid-Open No. 2001-277303, defects on the exterior surface due to excessive resin flow velocity, such as jetting, can be reduced. However, the formation of the non-uniform section due to disturbance of the resin flow cannot be satisfactorily suppressed. According to Japanese Patent Laid-Open No. 2001-277303, an irregular pattern including V-shaped grooves is proposed as the resin-flow-velocity reducing portion on the non-exterior surface. With this structure, when each V-shaped groove is cut along a longitudinal direction thereof, the width of the V-shaped groove is equal to the width of the resin molded article in the direction in which the V-shaped groove is cut. In addition, the height of each V-shaped groove is constant in the longitudinal direction of the V-shaped groove. Accordingly, disturbance of the resin flow occurs only in the thickness direction of the resin molded article, and the resin flow cannot be sufficiently disturbed. As a result, a non-uniform section appears on the surface of the molded article.

As another method according to the related art, the mold temperature and the resin temperature may be increased. However, when the mold temperature is increased, a long cooling time is required. Therefore, the molding cycle time increases and the productivity decreases. Also when the resin temperature is increased, the molding cycle time increases and the productivity decreases.

SUMMARY OF THE INVENTION

The present invention provides a molded article which includes a projecting or recessed portion on a non-exterior surface or a projecting or recessed portion on an exterior surface and in which formation of a non-uniform section, which is a section having a color different from that of other sections on the exterior surface, is suppressed.

According to an aspect of the present invention, a resin molded article includes an exterior surface, a non-exterior surface, and a projecting or recessed portion provided on at least one of the exterior surface and the non-exterior surface. A thickness between the exterior surface and the non-exterior surface is less than or equal to 3 mm. The non-exterior surface includes at least a repeated pattern of projections and/or recesses other than the projecting or recessed portion. A PV value of the projections and/or recesses is in the range of 0.01 mm or more and 1 mm or less. When the projections and/or recesses on the non-exterior surface are cut along a longitudinal direction thereof, a longitudinal dimension of each of the projections and/or recesses is smaller than a width of the resin molded article in the cutting direction. According to another aspect of the present invention, a resin molded article includes an exterior surface, a non-exterior surface, and a projecting or recessed portion provided on at least one of the exterior surface and the non-exterior surface. A thickness between the exterior surface and the non-exterior surface is less than or equal to 3 mm. The non-exterior surface includes a texture face other than the projecting or recessed portion, the texture face having a PV value in the range of 0.01 mm or more and 1 mm or less.

According to the aspects of the present invention, a molded article can be provided which includes a projecting or recessed portion on a non-exterior surface or a projecting or recessed portion on an exterior surface and in which formation of a non-uniform section on the exterior surface is suppressed.

Further features of the present invention will become apparent from the following description of exemplary embodiments with reference to the attached drawings.

DESCRIPTION OF THE EMBODIMENTS

Figure 1A:
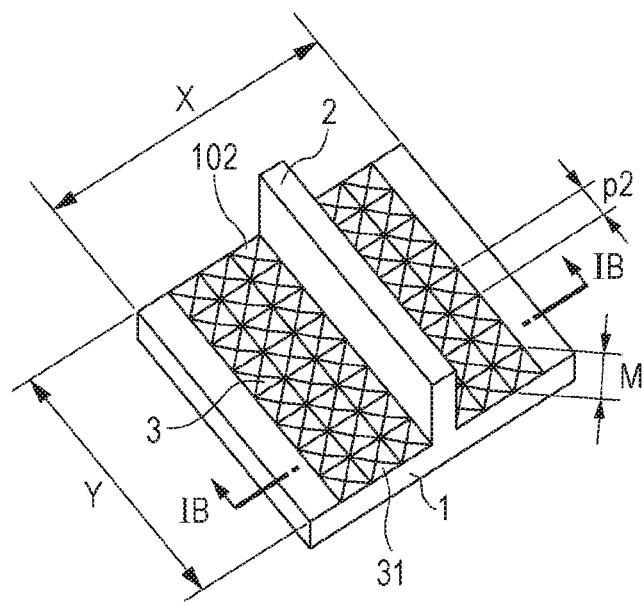
FIGS. 1A and 1B illustrate an embodiment of the present invention.
Figure 1B:
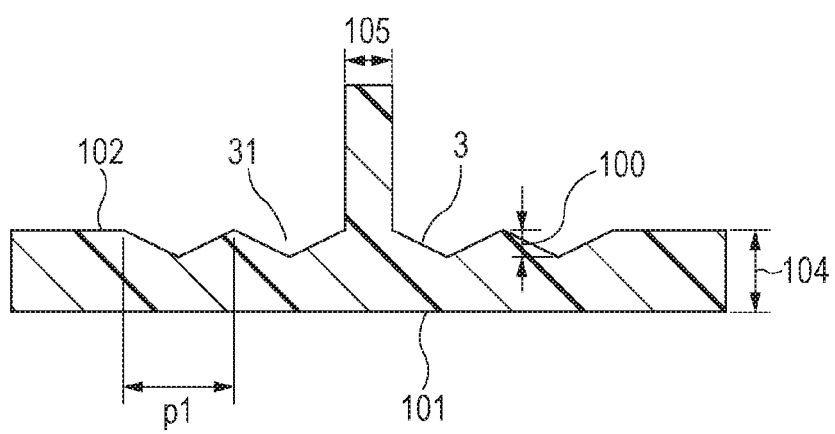
Figure 2A:
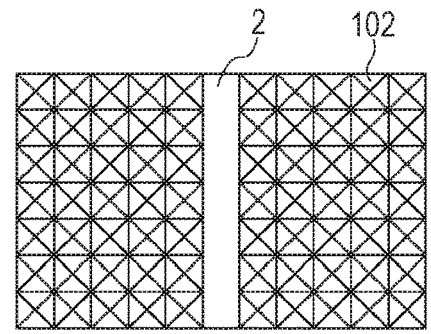
FIGS. 2A to 2D illustrate other embodiments of the present invention.
Figure 2B:
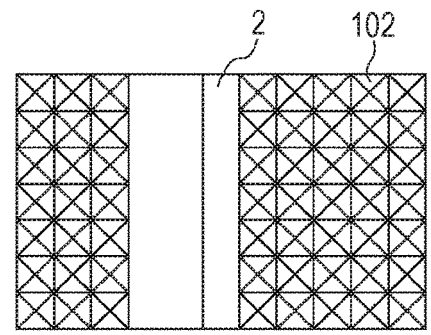
Figure 2C:
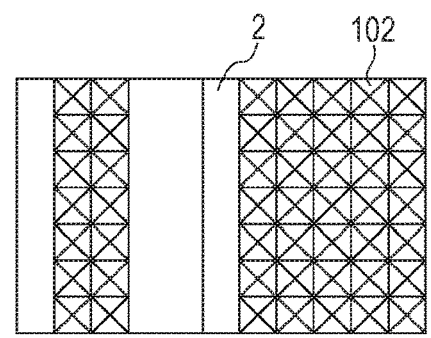
Figure 2D:
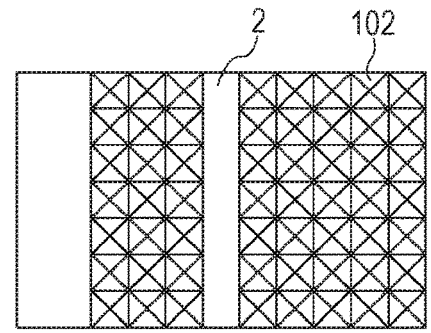

FIGS. 1A and 1B illustrate a plate-shaped resin molded article having a rib according to an embodiment of the present invention. Referring to FIGS. 1A and 1B, a plate-shaped resin molded article 1 includes an exterior surface 101 having a mirror face or a texture face, a non-exterior surface 102, and a rib 2 that projects from the non-exterior surface 102 of the resin molded article 1. The rib 2 is thin plate shaped and projects from the non-exterior surface. At least a bottom portion of the rib 2 has long and short sides. The non-exterior surface 102 has a repeated pattern 3 of recesses. The repeated pattern of recesses is formed of pattern units 31. M is the maximum width of the recesses. In addition, p1 is a width of the recesses in a direction perpendicular to the long sides of the rib, and p2 is a width of the recesses in a direction parallel to the long sides of the rib. According to the embodiment of the present invention, the width of the recesses is smaller than the width of the resin molded article in any direction. More specifically, referring to FIGS. 1A and 1B, the width p1 of the recesses in the direction perpendicular to the long sides of the rib 2 is smaller than the width X of the resin molded article in cross section of the resin molded article taken along the direction perpendicular to the long sides of the rib 2. In addition, the width p2 of the recesses in the direction parallel to the long sides of the rib 2 is smaller than the width Y of the resin molded article in cross section of the resin molded article taken along the direction parallel to the long sides of the rib 2. When the width of the recesses is smaller than the width of the resin molded article in any direction as described above, disturbance of the resin flow caused by projections and/or recesses occurs not only in the thickness direction of the resin molded article but also in directions around the projections and recesses. As a result, the resin flow is complexly disturbed in directions parallel to the plane of the resin molded article, and formation of a non-uniform section can be suppressed.

FIG. 1A is a schematic diagram illustrating the resin molded article 1. FIG. 1B is a sectional view of FIG. 1A taken along line IB-IB. Referring to FIGS. 1A and 1B, the repeated pattern 3 of recesses is formed by arranging at least a plurality of quadrangular-pyramid-shaped recesses.

Figure 17:
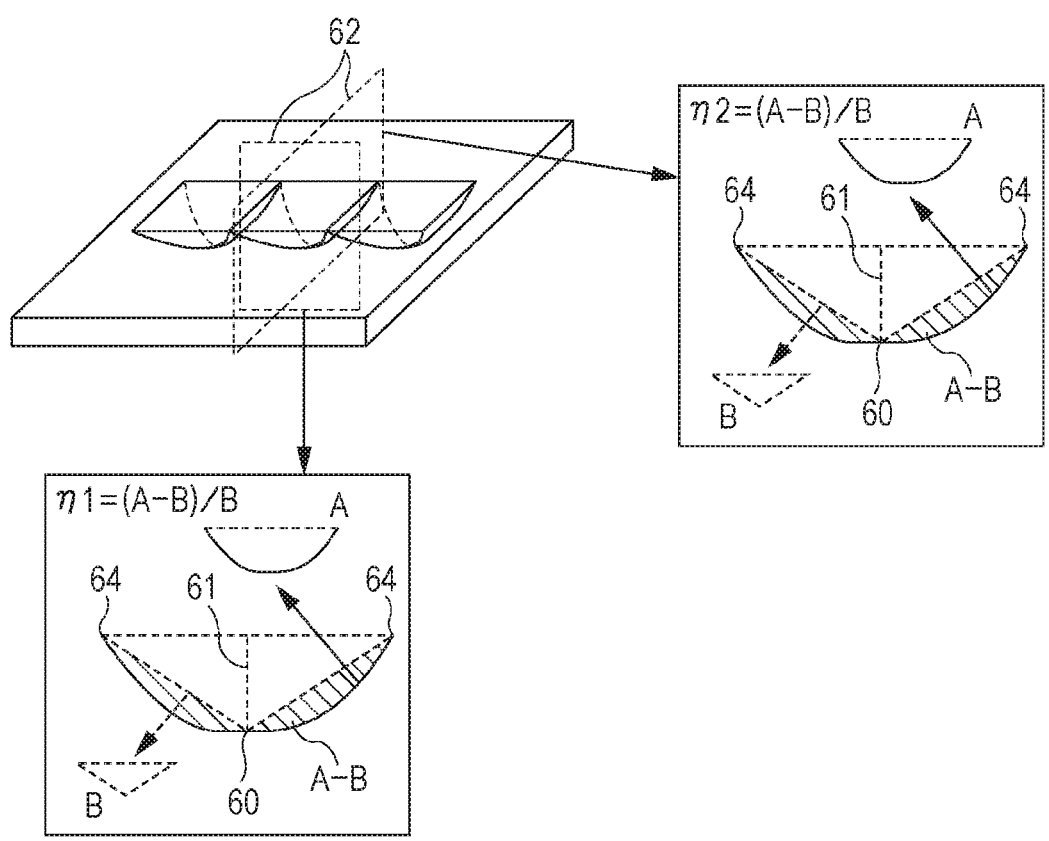
FIG. 17 illustrates another embodiment of the present invention.

FIG. 17 is a schematic diagram illustrating an area ratio $\eta$. Assuming that a projection plane 62 is an arbitrary plane including a normal line 61 dropped from a peak point 60 of a recess in the non-exterior surface 102 of the resin molded article to the non-exterior surface 102 and a contour of the recess is projected onto the projection plane 62, the shape of the recess may be defined by an area ratio $\eta$. The area ratio $\eta$ is calculated from a projection of the contour of the recess and a triangular reference projection formed by connecting three points, which are the peak point 60 and two end points 64 of the recess, with straight lines. The peak point 60 is a point that is used to determine a PV value of the recess and that is farthest from the non-exterior surface. The two end points 64 are the start point and the end point of the recess in the repeated pattern. The rotation angle of the projection plane 62 around the central axis of the normal line 61 may be set to an arbitrary angle. When A is the area of the projection of the contour of the recess and B is the area of the triangular reference projection, $\eta$ is calculated as $\eta=(A-B)/B$, where $\eta$ satisfies $-1<\eta\leq1$.

FIG. 17 illustrates an example in which the area ratio $\eta$ is calculated for each of two orthogonal projection planes 62 to define the shape of a projection or recess. In this case, $\eta$ is expressed as $\eta=(\eta 1,\eta 2)$, where $\eta 1$ is the area ratio on a first projection plane and $\eta 2$ is the area ratio on a second projection plane. FIG. 17 illustrates a quadrangular-pyramid-shaped recess having curved side surfaces as an example of the case in which $\eta=(0.5,0.5)$.

Figure 4A:
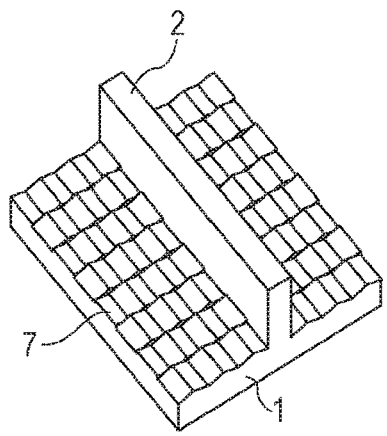
FIGS. 4A to 4E illustrate other embodiments of the present invention.
Figure 18A:
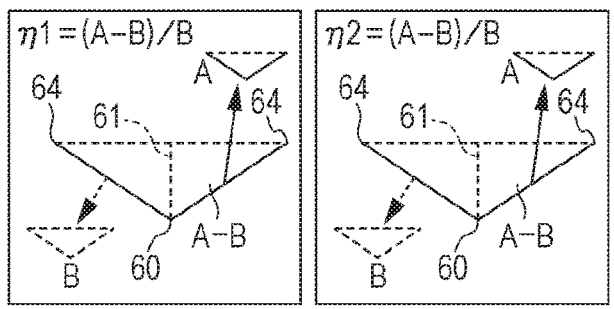
FIGS. 18A to 18E illustrate other embodiments of the present invention.
Figure 18B:
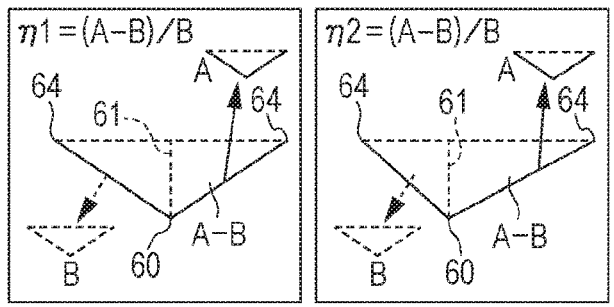
Figure 18C:
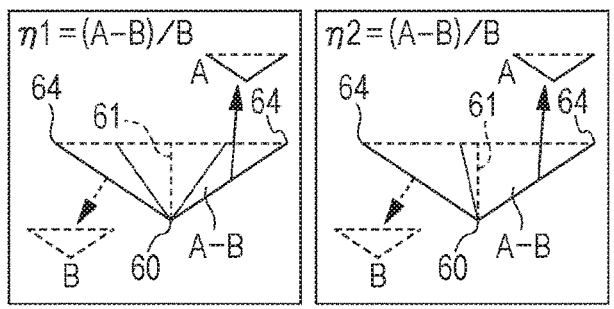
Figure 18D:
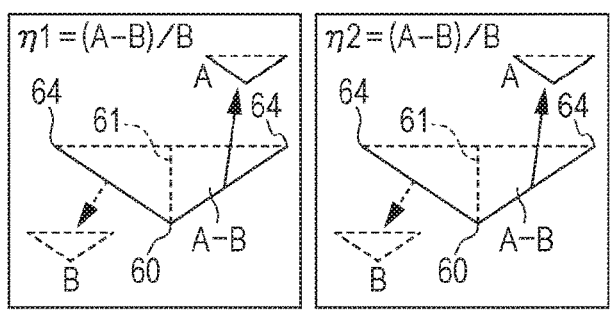
Figure 18E:
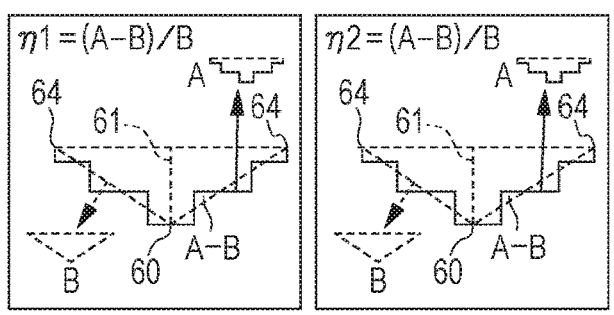
Figure 19A:
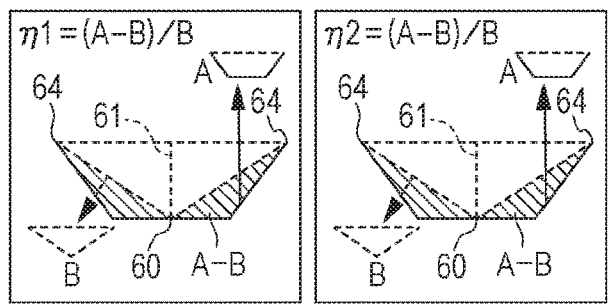
FIGS. 19A to 19E illustrate other embodiments of the present invention.
Figure 19B:
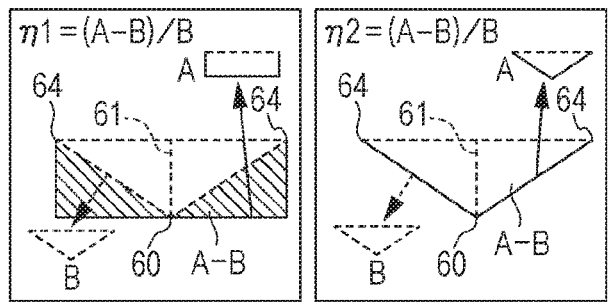
Figure 19C:
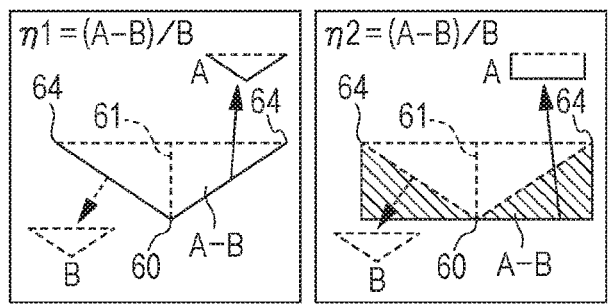

FIG. 18A illustrates an example of a quadrangular-pyramid-shaped recess, FIG. 18B an example of a triangular-pyramid-shaped recess, FIG. 18C an example of a pentagonal-pyramid-shaped recess, and FIG. 18D an example of a circular-cone-shaped recess. As is clear from these examples, when the recess has a polygonal pyramid shape, $\eta$ is $\eta=(0,0)$. FIG. 18E illustrates an example of a quadrangular-pyramid-shaped recess with stepped side surfaces. In this example, $\eta$ is calculated as $\eta=(0.1,0.1)$. FIG. 19A illustrates an example in which $\eta=(0.5,0.5)$, FIG. 19B an example in which $\eta=(1,0)$, FIG. 19C an example in which $\eta=(0,1)$, FIG. 19D an example in which $\eta=(0.5,1)$, and FIG. 19E an example in which $\eta=(1,1)$. FIG. 19A illustrates a recess having a truncated quadrangular pyramid shape. FIG. 19B illustrates a recess in a staggered pattern of triangular columnar portions illustrated in FIG. 4A. FIG. 19C illustrates a recess in a pattern obtained by rotating the staggered pattern of triangular columnar portions illustrated in FIG. 4A by 90° so that the ridge lines of the triangular columnar portions extend orthogonally to the long sides of the rib.

Figure 4B:
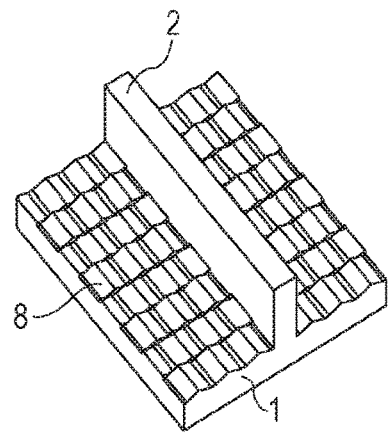
Figure 4C:
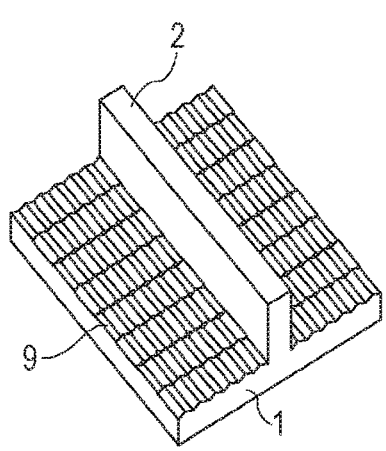
Figure 4D:
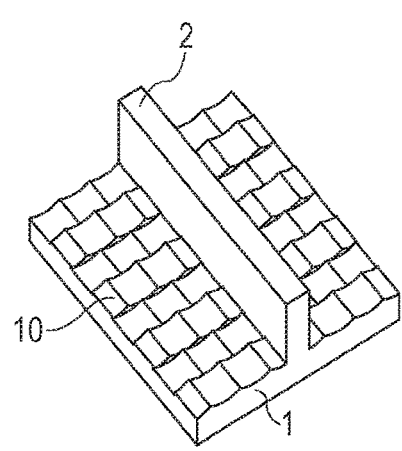
Figure 4E:
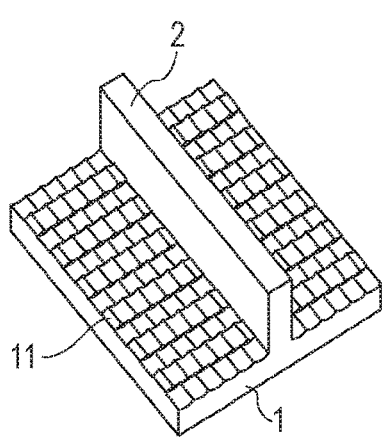
Figure 5A:
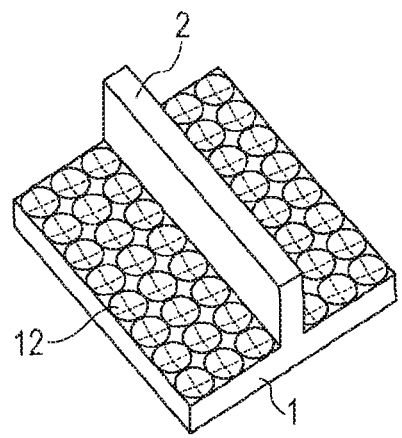
FIGS. 5A and 5B illustrate other embodiments of the present invention.
Figure 5B:
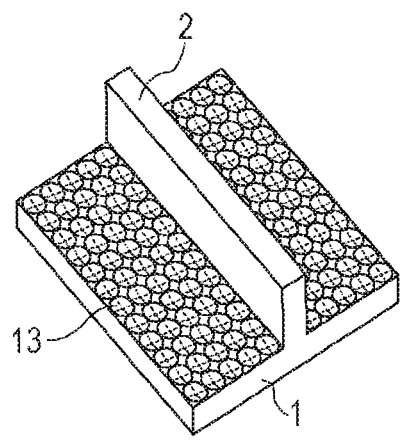
Figure 19D:
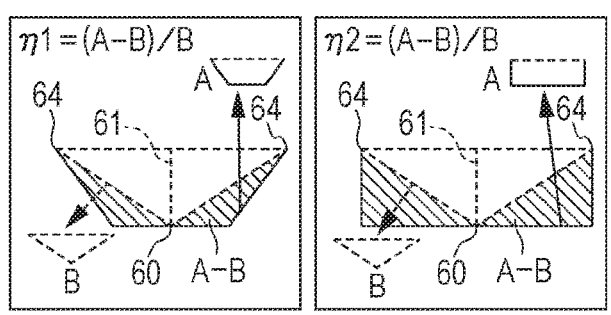
Figure 19E:
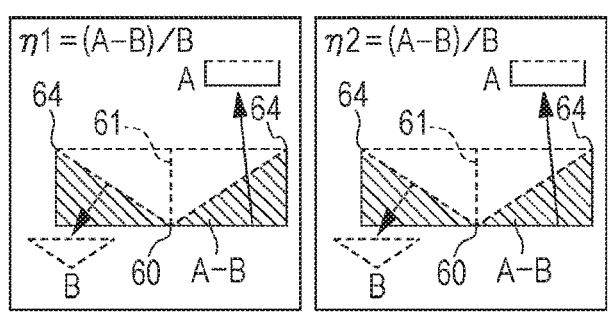
Figure 20A:
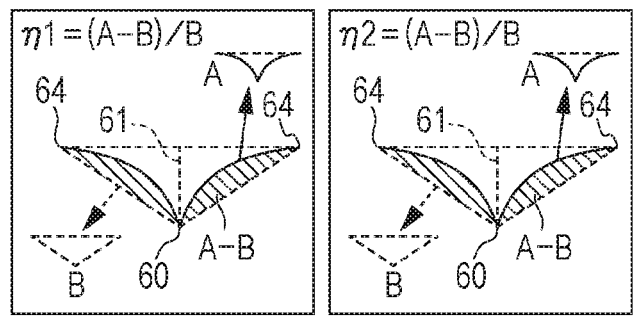
FIGS. 20A to 20D illustrate other embodiments of the present invention.
Figure 20B:
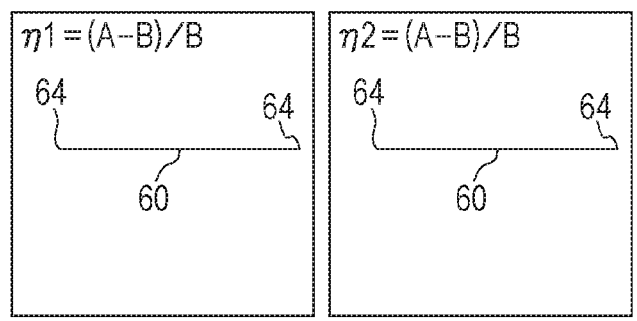
Figure 20C:
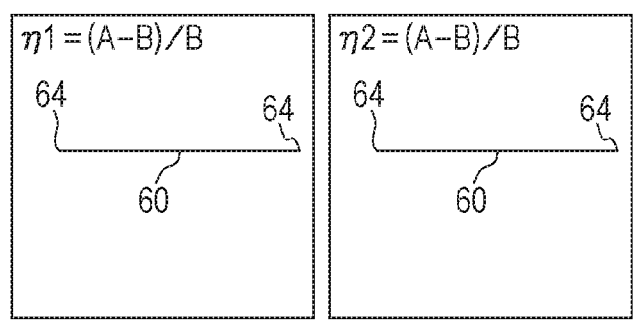
Figure 20D:
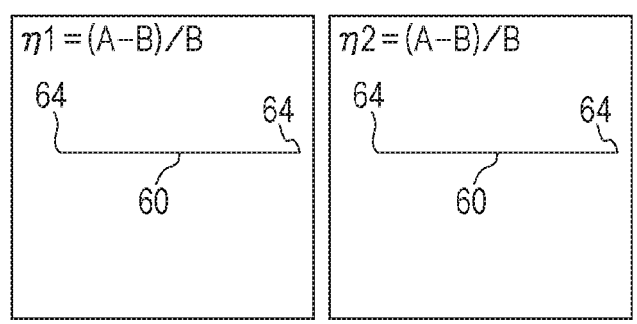

FIG. 19D illustrates a recess in a pattern obtained by rotating the staggered pattern of rectangular columnar portions illustrated in FIG. 4B by 90° so that the ridge lines of the rectangular columnar portions extend orthogonally to the long sides of the rib. FIG. 19E illustrates a recess in a staggered pattern of rectangular parallelepiped portions. When the value of η is positive, a projection or recess is present. When η is calculated as η=(1,1), there is a possibility that the thickness is small and no projection or recess is formed on the non-exterior surface 102. However, such a case is not considered. The area ratio η is used to define the shape of a projection or recess having a width smaller than the width X of the resin molded article, and is not applied to a region in which no projection or recess is formed. FIG. 20A illustrates an example in which η=(−0.5,−0.5), FIG. 20B an example in which η=(−1,0), FIG. 20C an example in which η=(0,−1), and FIG. 20D an example in which η=(−1,−1). As is clear from these examples, when either one of η1 and η2 is −1, no shape of a projection or recess can be defined. The case in which either one of η1 or η2 is −1 is equivalent to the case in which the non-exterior surface is flat at that location. The region in which the non-exterior surface is flat is called a flat portion. The flat part of a truncated pyramid shape as illustrated in FIG. 19A is not called a flat portion, and is considered as a part of a recess and used to calculate η. With regard to the repeated pattern of projections and/or recesses including a combination of projections, recesses, and flat portions, the area ratio η is not calculated for the flat portions but is calculated for each of the projections and recesses. Even when the widths p1 and p2 of each recess are not equal to each other, as illustrated in FIGS. 1A and 1B, the shape of the recess can be defined by the area ratio η. Although examples of recesses are described in the present embodiment, this also applies to projections. When the area ratio η of a projection or recess is in the range of −1<η≤1, formation of the non-uniform section can be reduced, as in the embodiment illustrated in FIGS. 1A and 1B.

In the present embodiment, the rib is explained as an example of a projecting portion that projects from the non-exterior surface 102 of the resin molded article. However, also when the rib is replaced by, for example, a lug which has a polygonal columnar bottom portion and provides connection to another resin molded article, a circular columnar boss, a spherical projecting portion, a circular columnar projecting or recessed portion formed by an ejector pin having a circular shape in cross section, or a polygonal columnar projecting or recessed portion formed by an ejector pin having a rectangular shape in cross section, a non-uniform section appears on the exterior surface. Also in these cases, the formation of the non-uniform section can be suppressed according to the present invention. In addition, the non-uniform section appears on the exterior surface also when a projecting or recessed portion or the like for introducing a product function to the user is formed on an exterior surface. Also in this case, the formation of the non-uniform section can be suppressed according to the present invention. The quadrangular-pyramid-shaped recesses can be arranged along the rib 2 at positions adjacent to the rib 2. The pattern units 31, which are quadrangular-pyramid-shaped recesses that form the repeated pattern of recesses, can be arranged at least in areas adjacent to the long sides of the bottom portion of the rib 2. In the present embodiment, the quadrangular-pyramid-shaped recesses are arranged adjacent to the rib 2. However, effects similar to the above-described effects can also be achieved when the recesses are separated from the rib 2 such that the minimum distance to the rib 2 is less than or equal to three times the width of the rib 2. The repeated pattern of the recesses can be formed over the entire area of the non-exterior surface by arranging the pattern units 31 over the entire area of the non-exterior surface. In the case where the repeated pattern of recesses is formed over the entire area of the non-exterior surface, the resin flow is disturbed over the entire area of the resin molded article. Therefore, the color difference can be reduced over the entire area of the exterior surface. FIGS. 2A to 2D illustrate examples of areas in which the repeated pattern is formed. In this specification, each of the projections and/or recesses that form the repeated pattern (each of the quadrangular-pyramid-shaped recesses in the present embodiment) is referred to as a "pattern unit".

In the present embodiment, the widths p1 and p2 of the bottom surfaces of the quadrangular-pyramid-shaped recesses in the direction perpendicular to the rib and the direction parallel to the rib, respectively, are both set to 1.2 mm. However, effects similar to the above-described effects can be achieved as long as the maximum width M of the bottom surfaces of the recesses (the maximum width of the recesses in the non-exterior surface, that is, the length of the diagonal of the bottom surface of each quadrangular-pyramid-shaped recess in the present embodiment) is in the range of 0.1 mm or more and 7.0 mm or less.

In the present embodiment, a repeated pattern of projections and/or recesses is formed of the quadrangular-pyramid-shaped recesses. However, the repeated pattern is not limited to this. For example, a repeated pattern of projections may be formed in which the pattern units 31 are quadrangular-pyramid-shaped projections. Other examples of shapes of the pattern units are illustrated in FIGS. 3A to 8E. Portions similar to those illustrated in FIGS. 1A and 1B are denoted by the same reference numerals, and explanations thereof are thus omitted. Referring to FIGS. 3A to 5B, the pattern units may be polygonal-pyramid-shaped recesses, such as triangular-pyramid-shaped recesses 4 (see FIG. 3A) or pentagonal-pyramid-shaped recesses 5 (see FIG. 3B), or polygonal-pyramid-shaped projections, such as triangular-pyramid-shaped projections or pentagonal-pyramid-shaped projections. In addition, the pattern units may be circular-cone-shaped recesses 6 (see FIG. 3C) or, of course, circular-cone-shaped projections. Alternatively, the repeated pattern of projections and/or recesses may be formed by arranging triangular columnar recesses 7 or projections, which serve as the pattern units, in a staggered pattern (see FIG. 4A). In this case, the pattern units are shaped such that triangular columns are cut along the axial direction thereof, and the repeated pattern of projections and/or recesses is formed by arranging the pattern units in a direction orthogonal to the axial direction such that the axial direction is parallel to the exterior surface. Similarly, the repeated pattern may be a staggered pattern of polygonal columnar portions, such as quadrangular columnar portions 8 (see FIG. 4B) or pentagonal columnar portions 9 (see FIG. 4C), a staggered pattern of columnar portions 10 having the shape of a circular column that is partially cut (see FIG. 4D), or a staggered pattern of semicircular columnar portions 11 (see FIG. 4E). Alternatively, the pattern units of the repeated pattern of projections and/or recesses may be spherical-crown-shaped recesses 12 (see FIG. 5A) or hemispherical recesses 13 (see FIG. 5B). The repeated pattern of projections and/or recesses may be formed by combining the above-described pattern units.

Figure 6A:
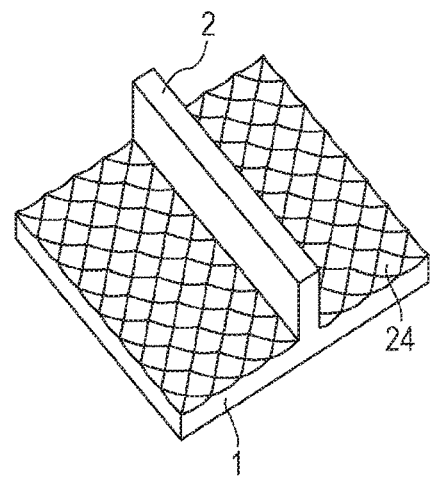
FIGS. 6A to 6E illustrate other embodiments of the present invention.
Figure 6B:
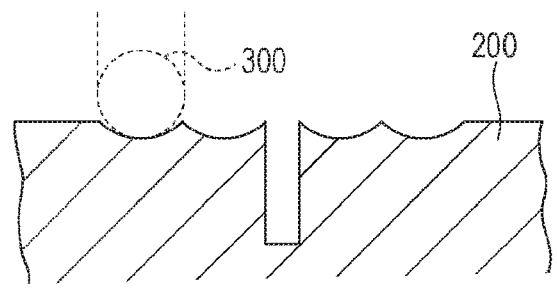
Figure 6C:
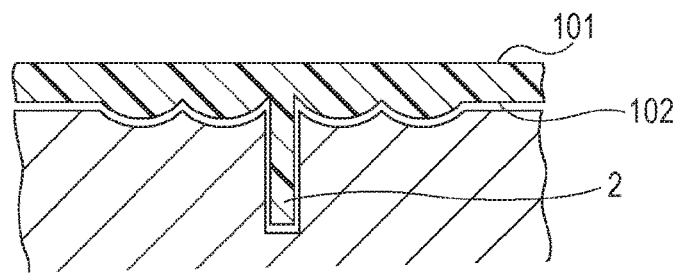
Figure 6D:
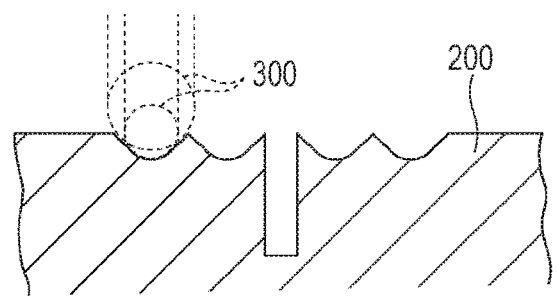
Figure 6E:
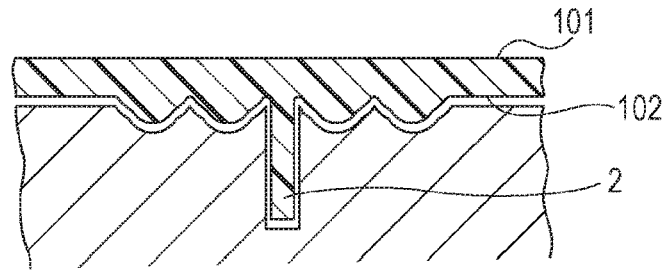
Figure 7A:
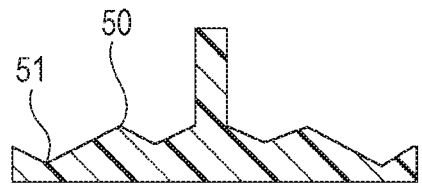
FIGS. 7A to 7D illustrate other embodiments of the present invention.
Figure 7B:
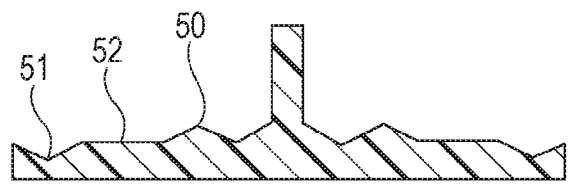
Figure 7C:
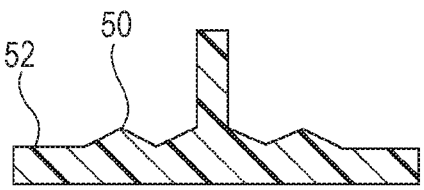
Figure 7D:
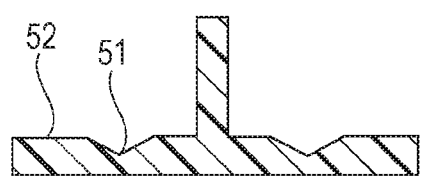

Referring to FIGS. 6A to 6E, the pattern units of the repeated pattern of projections and/or recesses may be cone-shaped recesses 24 (see FIG. 6A) having curved side surfaces or cone-shaped projections having curved side surfaces. The curved side surfaces of the cone-shaped portions may be formed as a combination of two or more types of curved surfaces (see FIGS. 6D and 6E). Referring to FIGS. 6B and 6C, cone-shaped projections having curved side surfaces may be formed by processing a surface of a mold 200 for forming the non-exterior surface 102 with a ball-end mill 300 and transferring the shape of the processed surface onto the non-exterior surface 102. Referring to FIGS. 6D and 6E, cone-shaped projections having side surfaces formed as a combination of two or more types of curved surfaces may be formed by processing a surface of a mold 200 for forming the non-exterior surface 102 with two types of ball-end mills 300 having different diameters and transferring the shape of the processed surface onto the non-exterior surface 102.

The repeated pattern of projections and/or recesses may be formed such that a plurality of lines of projections and/or recesses are arranged parallel to each other. The lines of projections and/or recesses may be shifted from each other by an amount less than the maximum width of the projections and/or recesses in the non-exterior surface. The pattern units formed of projections and/or recesses may be shaped such that triangular columns, quadrangular columns, pentagonal columns, circular columns, semicircular columns, etc., are cut along the axial direction. Further advantageous effects may be achieved when the repeated pattern of projections and/or recesses is formed over the entire area of the non-exterior surface.

Figure 3A:
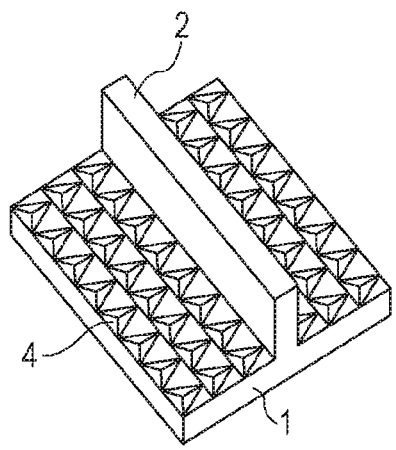
FIGS. 3A to 3C illustrate other embodiments of the present invention.
Figure 3B:
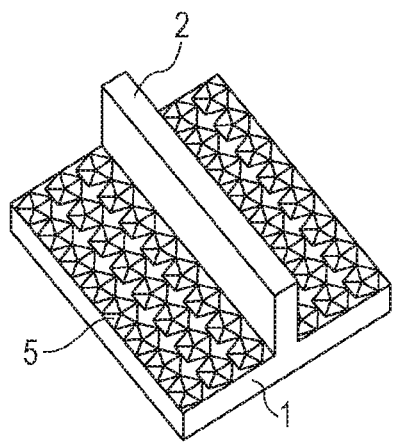
Figure 3C:
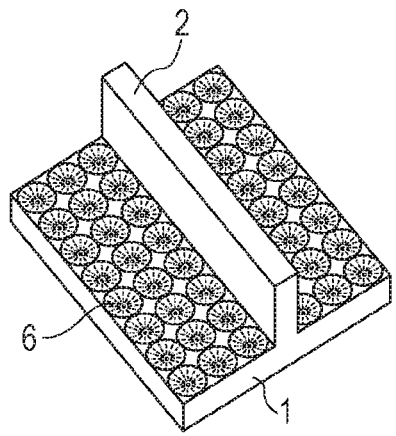

In the embodiments illustrated in FIGS. 3A to 3C, several-millimeter squares are provided as units to be arranged next to each other, and triangular, pentagonal, or circular bottom surfaces are arranged in the respective units. However, effects similar to the above-described effects may be obtained also when the triangular, pentagonal, or circular bottom surfaces are arranged without gaps therebetween. In addition, effects similar to the above-described effects can also be achieved when blank sections partially exist in the pattern of projections and/or recesses. In the case where the projections and/or recesses are polygonal-pyramid-shaped recesses, lines that connect the centers of the bottom surfaces of the polygonal pyramids can be arranged so as to extend parallel or perpendicular to the rib 2. However, effects similar to the above-described effects may, of course, also be achieved when the lines that connect the centers are inclined with respect to the rib 2 at an angle in the range of 0 to 90 degrees.

Referring to FIGS. 7A to 7D, effects similar to the above-described effects may also be obtained when the repeated pattern of projections and/or recesses is formed by combining of two or more types of portions selected from projections 50, recesses 51, and flat portions 52.

The pattern units may be a combination of two or more types of projections and recesses having different dimensions or shapes.

FIGS. 8A to 8E illustrate a plate-shaped resin molded article having a rib according to other embodiments of the present invention. Referring to FIGS. 8A to 8E, a plate-shaped resin molded article 1 includes an exterior surface 101 having a mirror face or a texture face, a non-exterior surface 102, and a rib 2 that projects from the non-exterior surface 102 of the resin molded article 1. The rib 2 is thin plate shaped and projects from the non-exterior surface. At least a bottom portion of the rib 2 has long and short sides. The non-exterior surface 102 has a texture face 25 formed by etching. The texture face 25 has a texture pattern formed of projections and/or recesses.

Figure 8A:
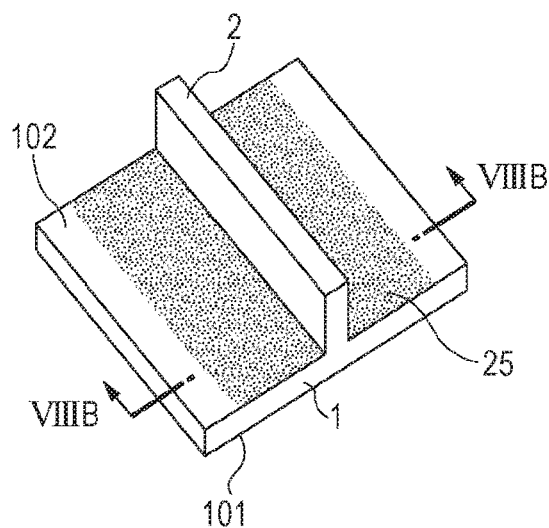
FIGS. 8A to 8E illustrate other embodiments of the present invention.
Figure 8B:
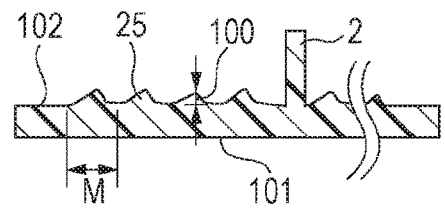
Figure 8C:
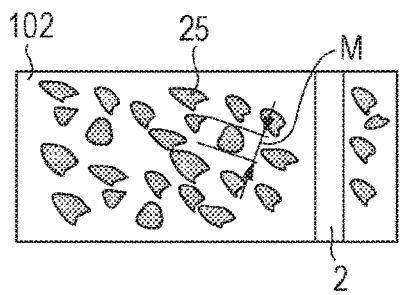
Figure 8D:
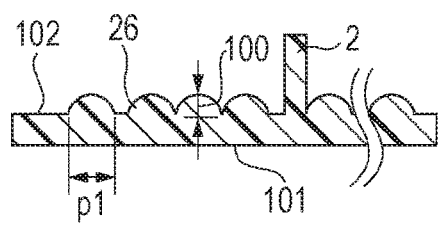
Figure 8E:
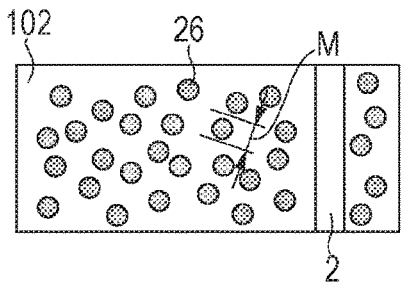

FIG. 8A is a schematic diagram illustrating the resin molded article 1. FIG. 8B is a sectional view of FIG. 8A taken along line VIIIB-VIIIB, illustrating the texture pattern formed by etching. FIG. 8C is a schematic diagram illustrating the texture pattern formed by etching as viewed from the non-exterior-surface side. FIG. 8D is a sectional view of FIG. 8A taken along line VIIIB-VIIIB, illustrating the texture pattern formed by sand blasting. FIG. 8E is a schematic diagram illustrating the texture pattern formed by sand blasting as viewed from the non-exterior-surface side. A texture face 26 formed by sand blasting may be formed on the non-exterior surface 102. The texture patterns illustrated in FIGS. 8A to 8E include patterns along the plane as viewed in a direction perpendicular to the texture face, as well as patterns and depths as viewed in a cross sectional direction of the texture face. The texture pattern can be arranged along the rib 2 in areas adjacent to the rib 2. However, effects similar to the above-described effects can also be achieved when the texture pattern is separated from the rib 2 by a distance less than or equal to three times the width of the rib 2. Recesses included in the texture pattern can be arranged at least in areas adjacent to the long sides of the bottom portion of the rib 2.

Although the texture face including recesses is described in the present embodiment, a texture face including projections may be formed instead.

Figure 21:
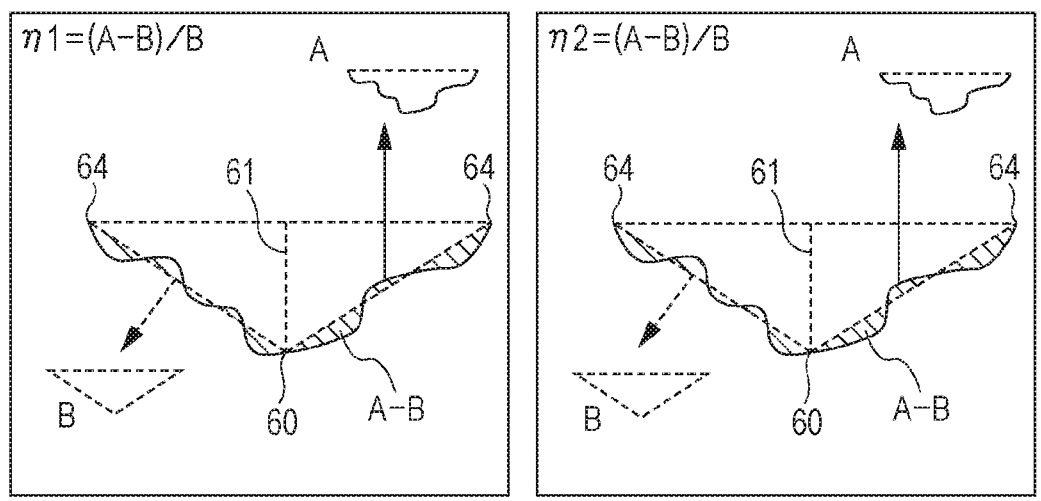
FIG. 21 illustrates another embodiment of the present invention.

The area ratio η of the present embodiment is illustrated in FIG. 21. As illustrated in FIG. 21, the area ratio η can also be calculated for the texture face, and is in the range of $-1 < \eta \leq 1$.

The maximum width M of the projections and/or recesses in the texture pattern on the non-exterior surface can be in the range of 0.1 mm or more and 7.0 mm or less.

The width of the projections and/or recesses in the repeated pattern of projections and/or recesses or the texture pattern can be less than or equal to the width of the projecting or recessed portion on the exterior surface or the non-exterior surface.

The present invention has been made on the basis of the results of the following experiments conducted by the inventors of the present invention.

Figure 9A:
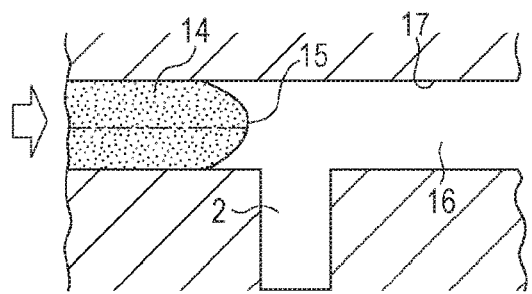
FIGS. 9A to 9F are sectional views illustrating the manner in which resin flows according to the related art.
Figure 9B:
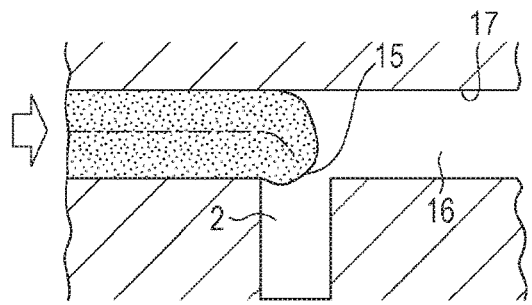
Figure 9C:
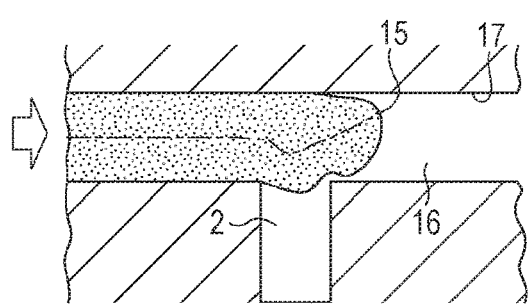
Figure 9D:
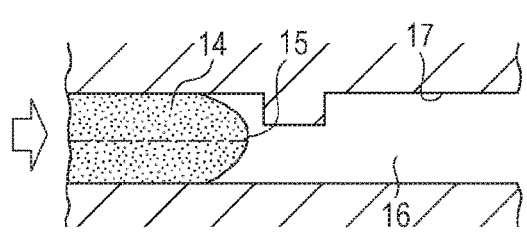
Figure 9E:
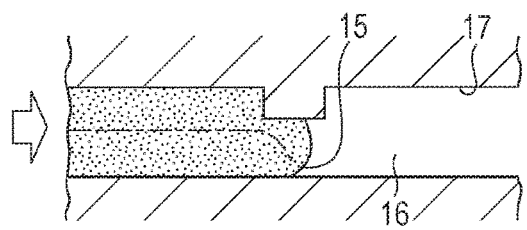
Figure 9F:
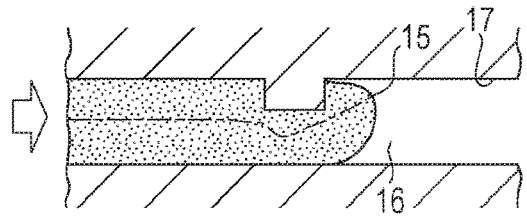
Figure 10A:
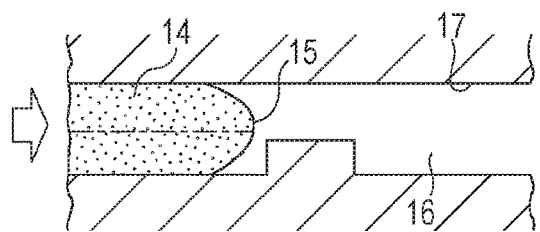
FIGS. 10A to 10F are sectional views illustrating the manner in which resin flows according to the related art.
Figure 10B:
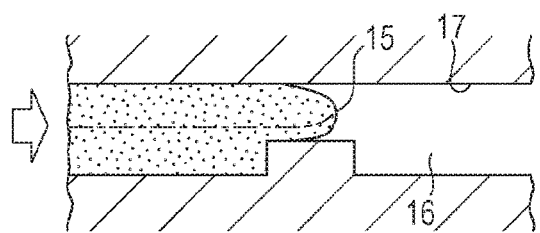
Figure 10C:
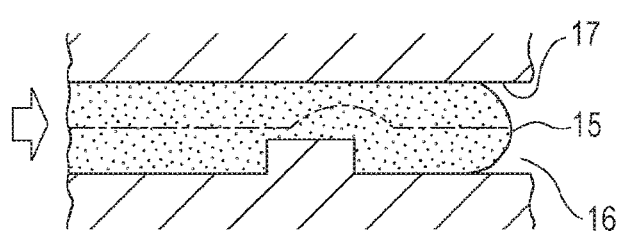
Figure 10D:
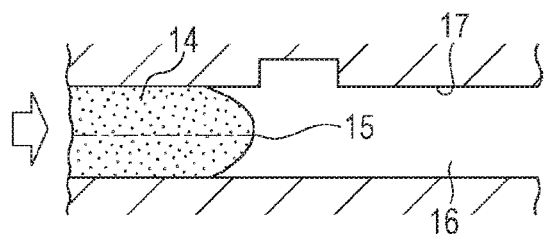
Figure 10E:
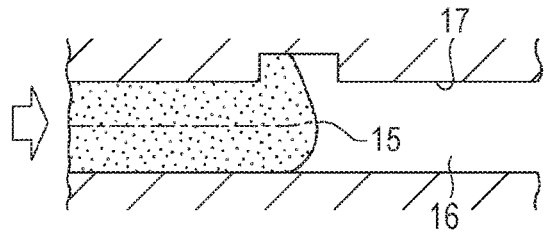
Figure 10F:
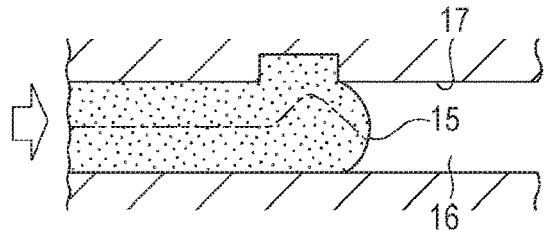
Figure 12:
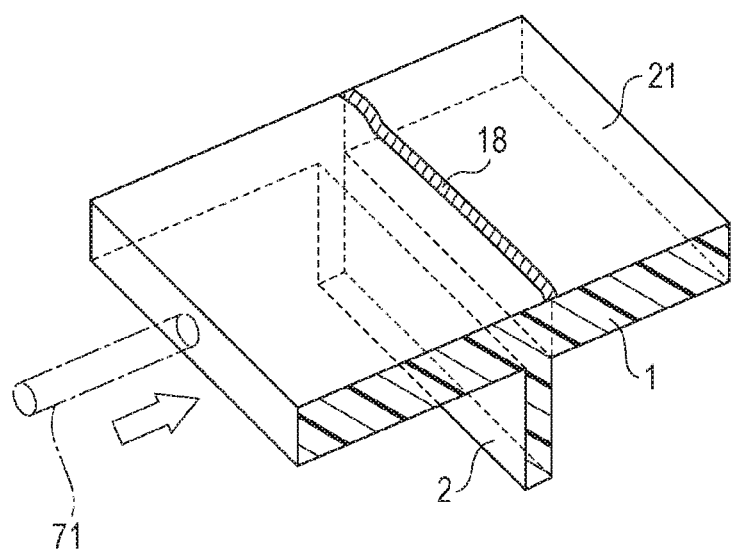
FIG. 12 is a perspective view illustrating a non-uniform section that appears on an exterior surface.

FIGS. 9A to 9C are diagrams illustrating the manner in which resin flows in an injection process for forming a molded article having a rib-shaped projecting portion that projects from a non-exterior surface, which has been discovered as a result of a resin-flow visualization experiment. FIGS. 10A to 10C are diagrams illustrating the manner in which resin flows in an injection process for forming a molded article having a recessed portion in a non-exterior surface, which has been discovered as a result of a resin-flow visualization experiment. FIGS. 9D to 9F are diagrams illustrating the manner in which resin flows in an injection process for forming a molded article having a recessed portion in an exterior surface. FIGS. 10D to 10F are diagrams illustrating the manner in which resin flows in an injection process for forming a molded article having a projecting portion on an exterior surface. The orientation of a flow front 15 of molten resin 14 that flows through a cavity 16 is parallel to a resin flow direction until the molten resin 14 reaches the rib 2. When the molten resin 14 reaches the rib 2, the molten resin 14 moves toward the rib 2, so that the flow front 15 is oriented toward the rib 2. Then, when the molten resin 14 passes the rib 2, the flow front 15 is oriented toward a mold surface 17 that corresponds to the exterior surface. The orientation of the flow front 15 toward the mold surface 17 that corresponds to the exterior surface is considered to be one of the causes of the formation of a non-uniform section. FIG. 12 is a perspective view of a plate-shaped resin molded article having a rib that projects from a non-exterior surface, illustrating a non-uniform section that appears on an exterior surface of the plate-shaped resin molded article. Referring to FIG. 12, a resin molded article 1 includes a thin wall portion and a rib 2 that projects from the non-exterior surface. The molten resin flows through a gate 71, which is an inlet that allows the molten resin to enter the cavity for forming the molded article. A non-uniform section 18 is formed on an exterior surface 21 of the molded article, and the position of the non-uniform section 18 corresponds to the downstream end of the rib 2 in the direction in which the molten resin flows. This position corresponds to the position at which the flow front 15 is oriented toward the mold surface 17 that corresponds to the exterior surface in FIGS. 9A to 9C.

Figure 11A:
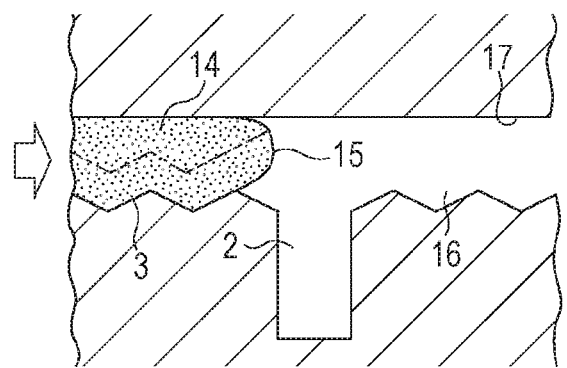
FIGS. 11A to 11C are sectional views illustrating the manner in which resin flows according to an embodiment of the present invention.
Figure 11B:
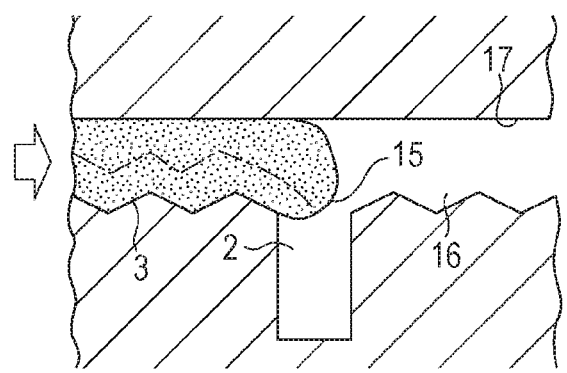
Figure 11C:
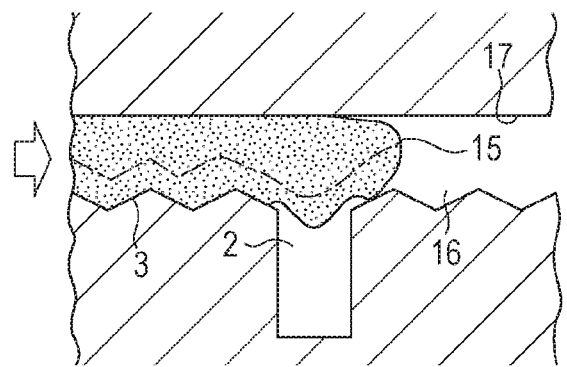

FIGS. 11A to 11C illustrate an embodiment of the present invention. FIGS. 11A to 11C are diagrams illustrating the manner in which resin flows in an injection process for forming a molded article having a repeated pattern of quadrangular-pyramid-shaped recesses on a non-exterior surface in areas adjacent to the rib. Portions similar to those illustrated in FIGS. 9A to 9F are denoted by the same reference numerals, and explanations thereof are thus omitted. The molten resin 14 flows into the quadrangular-pyramid-shaped recesses that form the repeated pattern 3 in various directions. Therefore, the flow of the molten resin 14 is disturbed. Thus, the flow of the molten resin 14 is disturbed not only at the rib 2 but also in other areas. In addition, the disturbance not only occurs in the direction in which the molten resin 14 flows, but also slightly occurs in other various angular directions. This probably contributes to making the color difference less recognizable as a non-uniform section, as compared with the related art in which the color difference appears on the exterior surface only at the bottom of the rib 2.

The present invention is based on the result of the above-described experiments. It has been found that the formation of the non-uniform section due to the projecting or recessed portion on the non-exterior surface or the projecting or recessed portion on the exterior surface can be reduced by forming projections and/or recesses for disturbing the resin flow on the non-exterior surface.

FIGS. 11A to 11C illustrate an example of a resin molded article including a rib-shaped projecting portion that projects from the non-exterior surface. However, the above discussion also applies to a resin molded article having a recessed portion in an exterior surface, a resin molded article having a recessed portion in a non-exterior surface, or a resin molded article having a projecting portion on an exterior surface, as illustrated in FIGS. 9D to 9F and FIGS. 10A to 10F. In each of the embodiments illustrated in FIGS. 1A to 8E, the resin molded article has a projecting portion that projects from the non-exterior surface thereof. However, effects of the present invention can also be achieved when one or both of a projecting portion that projects from the non-exterior surface and a recessed portion that is recessed from the exterior surface are formed on the resin molded article.

Referring to FIG. 1B, the present invention is most effective when a thickness 104 between the exterior surface 101 and the non-exterior surface 102 is 3 mm or less. When the thickness 104 is larger than 3 mm, the exterior surface 21 is not affected by the disturbance of the molten resin 14 due to the rib 2, and the non-uniform section is not formed. In FIG. 1B, reference numeral 105 illustrates the thickness of the rib.

The repeated pattern of projections and/or recesses has a height difference 100 (distance from the top points of the projections to the bottom points of the recesses), which is defined as a PV value in this specification. The present invention is most effective when the PV value is 0.01 mm or more and 1 mm or less. When the PV value is less than 0.01 mm, the flow of the molten resin cannot be sufficiently disturbed by the repeated pattern of projections and/or recesses, and the formation of the non-uniform section cannot be suppressed. When the PV value is greater than 1 mm, the flow of the molten resin 14 can be disturbed by the repeated pattern of projections and/or recesses. However, non-uniform sections corresponding to the repeated pattern of projections and/or recesses will be formed on the exterior surface 21. As a result, the appearance will be degraded.

In FIGS. 1A and 1B, the present invention is most effective when the maximum width M of the quadrangular-pyramid-shaped recesses is in the range of 0.1 mm or more and 7.0 mm or less.

In addition, the present invention is most effective when the exterior surface 101 is black or dark in color. In addition, the present invention is most effective when the surface of the exterior surface 21 is a glossy mirror face or a texture face.

A molding method for forming a resin molded article according to an embodiment of the present invention will now be described. The resin molded article according to the embodiment of the present invention can be manufactured by a known injection molding method. The repeated pattern of projections and/or recesses is formed by, for example, the following process. That is, first, a V-shaped end mill is moved along a recessed portion (for forming the rib) in a mold that forms a cavity for forming the non-exterior surface. Then, the angle of the moving direction of the end mill is changed, and the end mill is moved again. Accordingly, a repeated pattern of projections and/or recesses in which polygonal-pyramid-shaped projections are arranged is formed. Cone-shaped or columnar portions having curved side surfaces can be formed by using a ball-end mill in place of the above-described V-shaped end mill. In addition, cone-shaped or columnar portions having side surfaces formed as a combination of two types of curved surfaces can be formed by using two types of ball-end mills having different diameters (see FIGS. 6D and 6E). Then, an injection molding process is performed to transfer the repeated pattern onto a resin molded article. Thus, a resin molded article having a repeated pattern of projections and/or recesses in which polygonal-pyramid-shaped recesses are arranged can be manufactured. With regard to the texture face, a texture pattern is formed by etching, shot blasting, or sand blasting on a mold that forms a cavity for forming the non-exterior surface. Then, an injection molding process is performed to transfer the texture pattern onto a resin molded article. Thus, a resin molded article having a texture pattern can be manufactured (see FIGS. 8A to 8E).

According to the present invention, effects similar to the above-described effects can also be achieved when the exterior surface 21 is dark in color. In addition, the surface of the exterior surface 21 is not limited to a glossy mirror face, and effects similar to the above-described effects can be achieved when the exterior surface 21 is a texture face.

According to the present invention, the mold temperature is not limited. Effects similar to the above-described effects can be achieved when, for example, the mold temperature is close to the glass transition temperature of the resin. In addition, effects similar to the above-described effects can also be achieved when the mold temperature is sufficiently low.

According to the present invention, the kind of the resin is also not limited. Effects similar to the above-described effects can also be achieved when polycarbonate/acrylonitrile butadiene-styrene (PC/ABS), polystyrene (PS), high impact polystyrene (HIPS), etc., are used.

EXAMPLES

Figure 13:
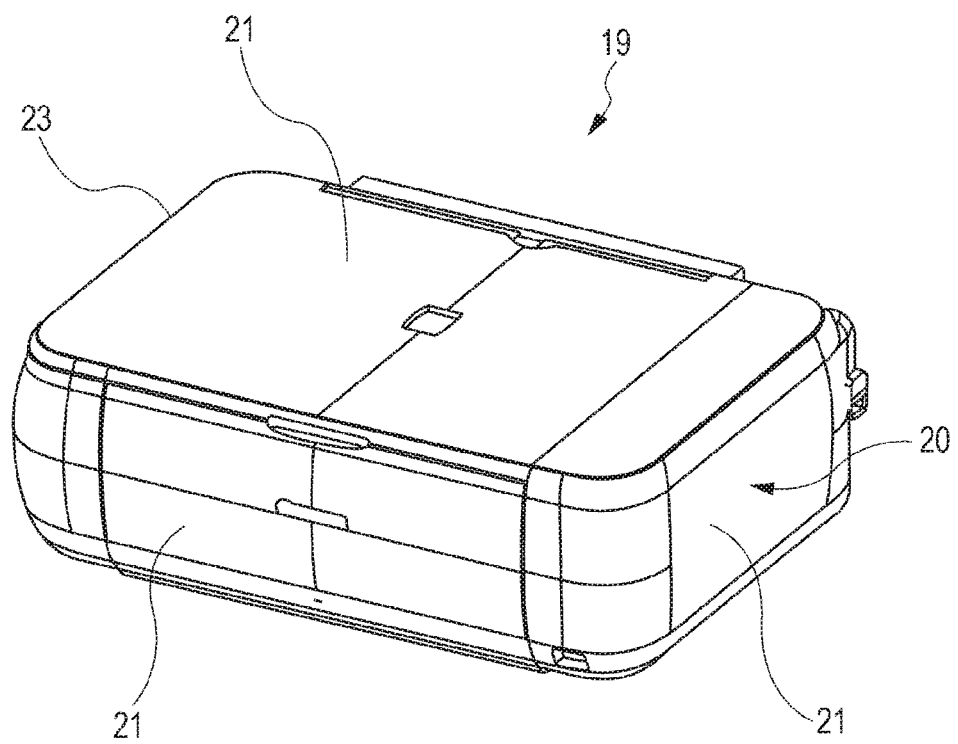
FIG. 13 is a perspective view of a multifunction printer including a document reading device to which the present invention is applied.
Figure 14:
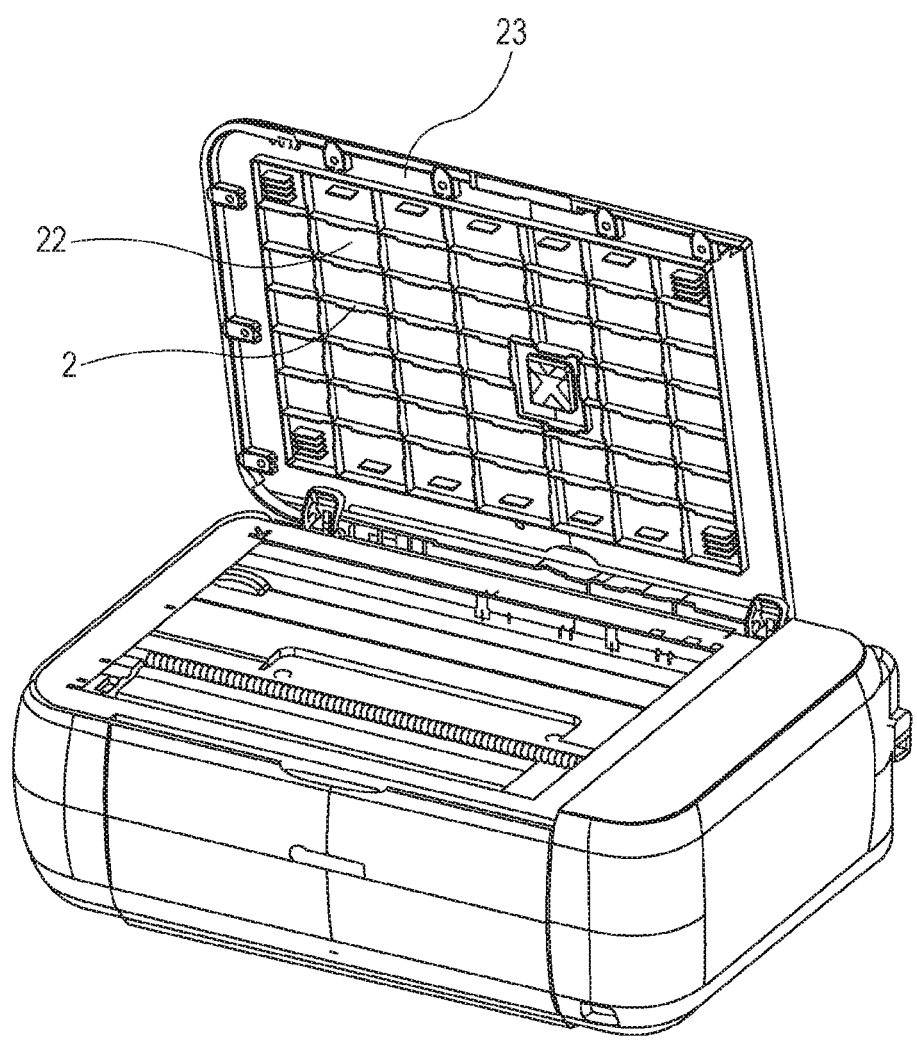
FIG. 14 is a perspective view of the multifunction printer including the document reading device to which the present invention is applied, illustrating the state in which a document cover is opened.

Examples of the present invention and comparative examples will now be described. As examples of the present invention, the present invention was applied to a document cover, which was a part of a housing of a multifunction printer including a document reading device. FIG. 13 is a perspective view of the multifunction printer including the document reading device to which the present invention was applied. In FIG. 13, a multifunction printer 19 includes a housing 20 that forms a document cover 23 and a main body of the multifunction printer 19. The housing 20 was made of black resin, and the surface thereof was a mirror face. FIG. 14 is a perspective view illustrating the state in which the document cover 23 is opened. In the examples, the present invention was applied to a non-exterior surface 22 of the document cover 23 illustrated in FIG. 14.

First Example

In the first example, the repeated pattern of projections and/or recesses was formed on the non-exterior surface 22 of the document cover 23 illustrated in FIG. 14. The thickness of the document cover 23 was 2.3 mm, and the thickness of the rib 2 was 1.2 mm. The document cover 23 was black, and the exterior surface 21 thereof was a glossy mirror face. The molding process was performed under the following conditions: the mold temperature was 50° C., the injection time was 2.5 s, and the resin temperature was 220° C. ABS was used as the resin material.

Quadrangular-pyramid-shaped recesses were formed as the pattern units of the repeated pattern of projections and/or recesses on the non-exterior surface 22. The width p1 of the recesses in the direction perpendicular to the rib 2 and the width p2 of the recesses in the direction parallel to the rib 2 were both set to 1.2 mm. The maximum width M was set to 1.69 mm. The PV value was set to 0.1 mm. The quadrangular-pyramid-shaped recesses were formed over the entire area of the non-exterior surface 22. The area ratio η of each pattern unit was η=(0,0).

Second Example

A document cover 23 was formed under the same conditions as the conditions of the first example except the thickness of the document cover 23 was set to 3.0 mm.

Third Example

A document cover 23 was formed under the same conditions as the conditions of the first example except the thickness of the document cover 23 was set to 3.1 mm.

Fourth Example

A document cover 23 was formed under the same conditions as the conditions of the first example except the thickness of the document cover 23 was set to 0.5 mm.

First Comparative Example

A document cover was formed under the same conditions as the conditions of the first example except the repeated pattern of projections and/or recesses was not formed on the non-exterior surface 22.

Second Comparative Example

A document cover was formed under the same conditions as the conditions of the second example except the repeated pattern of projections and/or recesses was not formed on the non-exterior surface 22.

Third Comparative Example

A document cover was formed under the same conditions as the conditions of the third example except the repeated pattern of projections and/or recesses was not formed on the non-exterior surface 22.

Fourth Comparative Example

A document cover was formed under the same conditions as the conditions of the fourth example except the repeated pattern of projections and/or recesses was not formed on the non-exterior surface 22.

The results of the first to fourth examples and the first to fourth comparative examples are shown in Table 1. The numbers in Table 1 indicate the brightness deviation at the non-uniform section in the exterior surface, which was calculated from brightness data obtained by photographing the non-uniform section with a CCD camera. The appearance is degraded (the non-uniform section becomes more conspicuous) as the deviation increases in the negative direction, and is improved (the non-uniform section less conspicuous) as the deviation approaches 0. Visual evaluation was also performed, and it was confirmed that when the deviation is −25 or less, the non-uniform section is visually recognized. In the "evaluation result" column, circles indicate that the non-uniform section is not conspicuous and x-marks indicate that the non-uniform section is conspicuous. Triangles indicate that the non-uniform section is not conspicuous but is slightly noticeable.

TABLE 1

| | Shape of Projections/Recesses | Thickness | Deviation | Evaluation Result |
| --- | --- | --- | --- | --- |
| 1st Example | Quadrangular Pyramid (Recesses) | 2.3 mm | −13.1 | ○ |
| 2nd Example | Quadrangular Pyramid (Recesses) | 3.0 mm | −10.1 | ○ |
| 3rd Example | Quadrangular Pyramid (Recesses) | 3.1 mm | −9.8 | ○ |
| 4th Example | Quadrangular Pyramid (Recesses) | 0.5 mm | −15.6 | ○ |
| 1st Comparative Example | Flat | 2.3 mm | −27.4 | X |
| 2nd Comparative Example | Flat | 3.0 mm | −26.3 | X |
| 3rd Comparative Example | Flat | 3.1 mm | −25 | Δ |
| 4th Comparative Example | Flat | 0.5 mm | −28.5 | X |

Fifth Example

A document cover was formed under the same conditions as the conditions of the first example except the PV value of the quadrangular-pyramid-shaped recesses formed in the non-exterior surface 22 was set to 1 mm. The area ratio η of each quadrangular-pyramid-shaped recess was η=(0,0).

Sixth Example

A document cover was formed under the same conditions as the conditions of the first example except the PV value of the quadrangular-pyramid-shaped recesses formed in the non-exterior surface 22 was set to 0.01 mm. The area ratio η of each quadrangular-pyramid-shaped recess was η=(0,0).

Fifth Comparative Example

A document cover was formed under the same conditions as the conditions of the first example except the PV value of the quadrangular-pyramid-shaped recesses formed in the non-exterior surface 22 was set to 1.1 mm. The area ratio η of each quadrangular-pyramid-shaped recess was η=(0,0).

Sixth Comparative Example

A document cover was formed under the same conditions as the conditions of the first example except the PV value of the quadrangular-pyramid-shaped recesses formed in the non-exterior surface 22 was set to 0.009 mm. The area ratio η of each quadrangular-pyramid-shaped recess was η=(0,0).

The results of the fifth and sixth examples and the first, fifth, and sixth comparative examples are shown in Table 2.

TABLE 2

| | Shape of Projections/Recesses | PV value | Deviation | Evaluation Result |
|---|---|---|---|---|
| 5th Example | Quadrangular Pyramid (Recesses) | 1 mm | −24.8 | Δ |
| 6th Example | Quadrangular Pyramid (Recesses) | 0.01 mm | −24.5 | Δ |
| 1st Comparative Example | Flat | 0 mm | −27.4 | X |
| 5th Comparative Example | Quadrangular Pyramid (Recesses) | 1.1 mm | −26.9 | X |
| 6th Comparative Example | Quadrangular Pyramid (Recesses) | 0.009 mm | −27 | X |

Seventh Comparative Example

A document cover was formed under the same conditions as the conditions of the first example except the width of the quadrangular-pyramid-shaped portions formed on the non-exterior surface 22 was set to the same width as the width of the document cover.

Figure 15A:
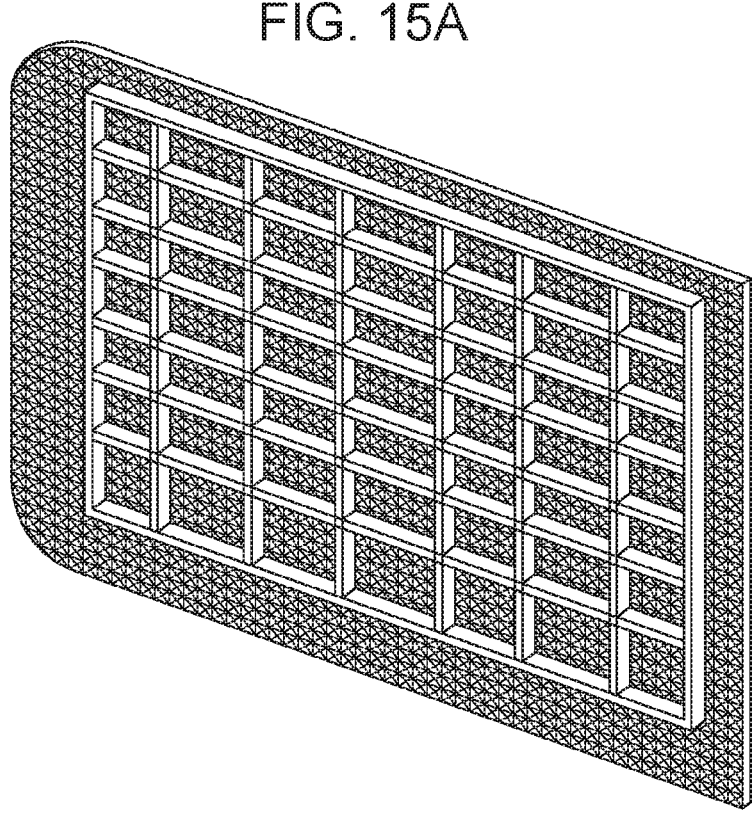
FIGS. 15A and 15B illustrate other embodiments of the present invention.
Figure 15B:
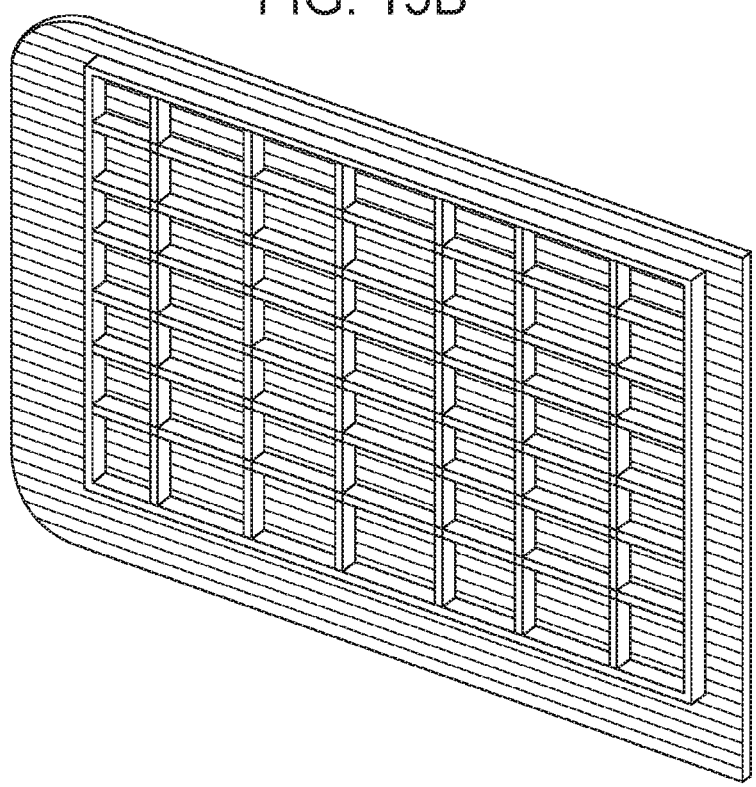
Figure 16A:
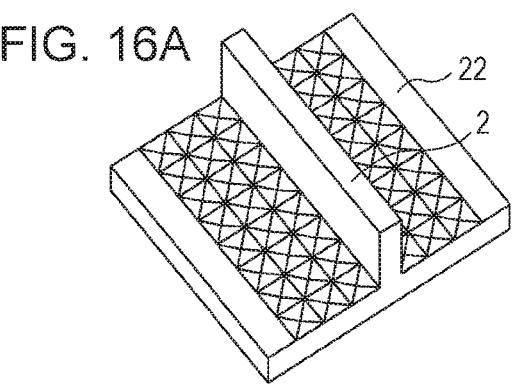
FIGS. 16A to 16G illustrate other embodiments of the present invention.
Figure 16B:
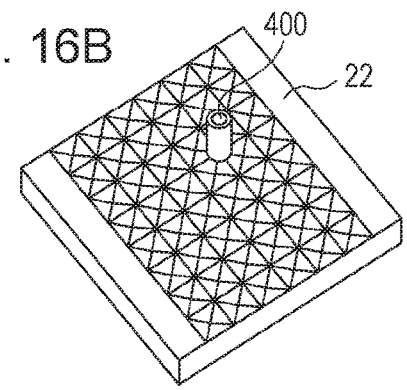
Figure 16C:
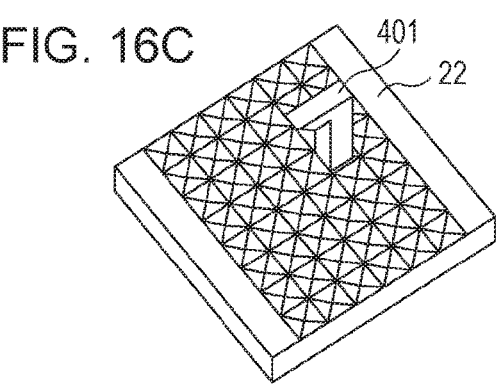
Figure 16D:
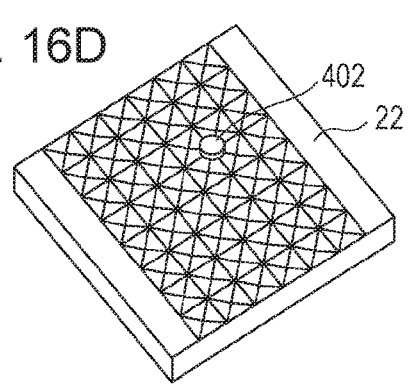
Figure 16E:
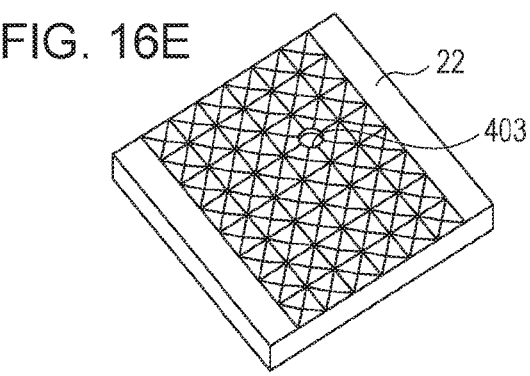
Figure 16F:
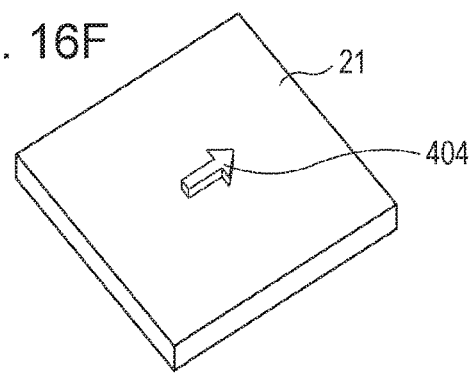
Figure 16G:
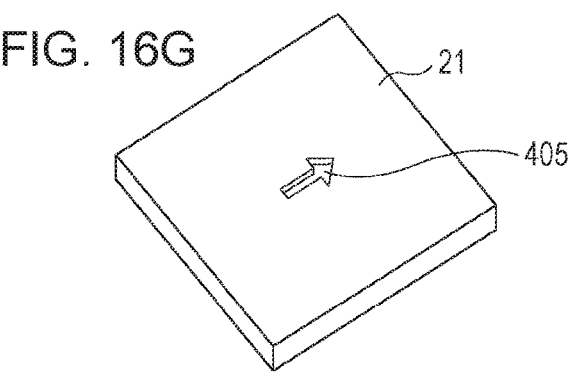

The results of the first example and the first and seventh comparative examples are shown in Table 3. FIGS. 15A and 15B are schematic diagrams illustrating the first example and the seventh comparative example, respectively.

TABLE 3

| | Shape of Projections/Recesses | Widths of Projections/Recesses and Molded Article | Deviation | Evaluation Result |
|---|---|---|---|---|
| 1st Example | Quadrangular Pyramid (Recesses) | Width of Recesses is Shorter | −13.1 | ○ |
| 1st Comparative Example | Flat | — | −27.4 | X |
| 7th Comparative Example | V-Shaped Grooves | Same | −25.3 | X |

In seventh to twelfth examples, the shape of the projecting or recessed portion on the non-exterior surface was changed to various shapes. FIGS. 16A to 16G show the shapes of the projecting or recessed portion on the non-exterior surface.

Seventh Example

A document cover was formed under the same conditions as the conditions of the first example except a boss 400 (see FIG. 16B) having a circular shape in cross section was formed on the non-exterior surface 22 instead of the rib 2 (see FIG. 16A) formed in the first example.

Eighth Example

A document cover was formed under the same conditions as the conditions of the first example except a connecting lug 401 (see FIG. 16C) having a rectangular shape in cross section was formed on the non-exterior surface 22 instead of the rib 2 (see FIG. 16A) formed in the first example.

Ninth Example

A document cover was formed under the same conditions as the conditions of the first example except a projecting portion 402 (see FIG. 16D) was formed on the non-exterior surface 22 by the ejector pin and the cavity instead of the rib 2 (see FIG. 16A) formed in the first example.

Tenth Example

A document cover was formed under the same conditions as the conditions of the first example except a recessed portion 403 (see FIG. 16E) was formed on the non-exterior surface 22 by the ejector pin and the cavity instead of the rib 2 (see FIG. 16A) formed in the first example.

Eleventh Example

A document cover was formed under the same conditions as the conditions of the first example except an arrow 404

(see FIG. 16F) having a projecting shape that indicates a product function was formed as a projecting portion on the exterior surface 21 in place of the rib 2 (see FIG. 16A) formed on the non-exterior surface 22 in the first example.

Twelfth Example

A document cover was formed under the same conditions as the conditions of the first example except an arrow 405 (see FIG. 16G) having a recessed shape that indicates a product function was formed in the exterior surface 21 in place of the rib 2 (see FIG. 16A) formed on the non-exterior surface 22 in the first example.

Eighth Comparative Example

A document cover was formed under the same conditions as the conditions of the seventh example except the repeated pattern of projections and/or recesses was not formed on the non-exterior surface 22.

Ninth Comparative Example

A document cover was formed under the same conditions as the conditions of the eighth example except the repeated pattern of projections and/or recesses was not formed on the non-exterior surface 22.

Tenth Comparative Example

A document cover was formed under the same conditions as the conditions of the ninth example except the repeated pattern of projections and/or recesses was not formed on the non-exterior surface 22.

Eleventh Comparative Example

A document cover was formed under the same conditions as the conditions of the tenth example except the repeated pattern of projections and/or recesses was not formed on the non-exterior surface 22.

Twelfth Comparative Example

A document cover was formed under the same conditions as the conditions of the eleventh example except the repeated pattern of projections and/or recesses was not formed on the non-exterior surface 22.

Thirteenth Comparative Example

A document cover was formed under the same conditions as the conditions of the twelfth example except the repeated pattern of projections and/or recesses was not formed on the non-exterior surface 22.

The results of the first and seventh to twelfth examples and the eighth to thirteenth comparative examples are shown in Table 4. The projecting or recessed portion on the exterior surface or the non-exterior surface according to the first and seventh to twelfth embodiments are illustrated in FIGS. 16A to 16G.

TABLE 4

|  | Shape of Projections/Recesses | Location of Projecting/Recessed Portion | Projecting/Recessed Portion | Deviation | Evaluation Result |
|---|---|---|---|---|---|
| 1st Example | Quadrangular Pyramid (Recesses) | Non-Exterior Surface | Rib | −13.1 | ○ |
| 7th Example | Quadrangular Pyramid (Recesses) | Non-Exterior Surface | Boss | −13.2 | ○ |
| 8th Example | Quadrangular Pyramid (Recesses) | Non-Exterior Surface | Lug | −13 | ○ |
| 9th Example | Quadrangular Pyramid (Recesses) | Non-Exterior Surface | Ejector-Pin Projecting Portion | −13.1 | ○ |
| 10th Example | Quadrangular Pyramid (Recesses) | Non-Exterior Surface | Ejector-Pin Recessed Portion | −13.1 | ○ |
| 11th Example | Quadrangular Pyramid (Recesses) | Exterior Surface | Arrow-Shaped Projecting Portion | −13.3 | ○ |
| 12th Example | Quadrangular Pyramid (Recesses) | Exterior Surface | Arrow-Shaped Recessed Portion | −13.3 | ○ |
| 8th Comparative Example | Flat | Non-Exterior Surface | Boss | −27.4 | X |
| 9th Comparative Example | Flat | Non-Exterior Surface | Lug | −27.3 | X |
| 10th Comparative Example | Flat | Non-Exterior Surface | Ejector-Pin Projecting Portion | −27.5 | X |
| 11th Comparative Example | Flat | Non-Exterior Surface | Ejector-Pin Recessed Portion | −27.1 | X |
| 12th Comparative Example | Flat | Exterior Surface | Arrow-Shaped Projecting Portion | −27.2 | X |
| 13th Comparative Example | Flat | Exterior Surface | Arrow-Shaped Recessed Portion | −27.2 | X |

Thirteenth Example

A document cover was formed under the same conditions as the conditions of the first example except the minimum distance from the rib 2 to the recesses in the non-exterior surface 22 was set to 3.6 mm.

Fourteenth Example

A document cover was formed under the same conditions as the conditions of the first example except the minimum distance from the rib 2 to the recesses in the non-exterior surface 22 was set to 4.0 mm.

Fifteenth Example

A document cover was formed under the same conditions as the conditions of the first example except the minimum distance from the rib 2 to the recesses in the non-exterior surface 22 was set to 3.6 mm and areas separated from the rib 2 by 20 mm or more were formed as flat surfaces without forming the recesses.

Sixteenth Example

A document cover was formed under the same conditions as the conditions of the first example except the minimum distance from the rib 2 to the recesses in the non-exterior surface 22 was set to 0 mm and areas separated from the rib 2 by 20 mm or more were formed as flat surfaces without forming the recesses.

The results of the first and thirteenth to sixteenth examples and the first comparative example are shown in Table 5. In Table 5, the recess start position is the minimum distance from the rib to the recesses and the recess end position is the maximum distance from the rib to the recesses.

and p2 of the quadrangular-pyramid-shaped recesses in the non-exterior surface 22 in the directions perpendicular to the rib 2 and parallel to the rib 2, respectively, were both set to 0.8 mm and the maximum width M was set to 1.13 mm. The area ratio η of each quadrangular-pyramid-shaped recess was η=(0,0).

Nineteenth Example

A document cover was formed under the same conditions as the conditions of the first example except the widths p1 and p2 of the quadrangular-pyramid-shaped recesses in the non-exterior surface 22 in the directions perpendicular to the rib 2 and parallel to the rib 2, respectively, were both set to 1.6 mm and the maximum width M was set to 2.26 mm. The area ratio η of each quadrangular-pyramid-shaped recess was η=(0,0).

Twentieth Example

A document cover was formed under the same conditions as the conditions of the first example except the widths p1 and p2 of the quadrangular-pyramid-shaped recesses in the non-exterior surface 22 in the directions perpendicular to the rib 2 and parallel to the rib 2, respectively, were both set to 2.0 mm and the maximum width M was set to 2.80 mm. The area ratio η of each quadrangular-pyramid-shaped recess was η=(0,0).

Twenty-First Example

A document cover was formed under the same conditions as the conditions of the first example except the widths p1 and p2 of the quadrangular-pyramid-shaped recesses in the non-exterior surface 22 in the directions perpendicular to the rib 2 and parallel to the rib 2, respectively, were both set to

TABLE 5

| | Shape of Projections/Recesses | Recess Start Position | Recess End Position | Deviation | Evaluation Result |
|---|---|---|---|---|---|
| 1st Example | Quadrangular Pyramid (Recesses) | 0 mm | End of Resin Molded Article | −13.1 | ○ |
| 13th Example | Quadrangular Pyramid (Recesses) | 3.6 mm | End of Resin Molded Article | −13.6 | ○ |
| 14th Example | Quadrangular Pyramid (Recesses) | 4.0 mm | End of Resin Molded Article | −24.9 | Δ |
| 15th Example | Quadrangular Pyramid (Recesses) | 3.6 mm | 20 mm | −14.1 | ○ |
| 16th Example | Quadrangular Pyramid (Recesses) | 0 mm | 20 mm | −13.2 | ○ |
| 1st Comparative Example | Flat | — | — | −27.4 | X |

Seventeenth Example

A document cover was formed under the same conditions as the conditions of the first example except the widths p1 and p2 of the quadrangular-pyramid-shaped recesses in the non-exterior surface 22 in the directions perpendicular to the rib 2 and parallel to the rib 2, respectively, were both set to 0.4 mm and the maximum width M was set to 0.56 mm. The area ratio η of each quadrangular-pyramid-shaped recess was η=(0,0).

Eighteenth Example

A document cover was formed under the same conditions as the conditions of the first example except the widths p1

3.0 mm and the maximum width M was set to 4.24 mm. The area ratio η of each quadrangular-pyramid-shaped recess was η=(0,0).

Twenty-Second Example

A document cover was formed under the same conditions as the conditions of the first example except the widths p1 and p2 of the quadrangular-pyramid-shaped recesses in the non-exterior surface 22 in the directions perpendicular to the rib 2 and parallel to the rib 2, respectively, were both set to 4.0 mm and the maximum width M was set to 5.65 mm. The area ratio η of each quadrangular-pyramid-shaped recess was η=(0,0).

Twenty-Third Example

A document cover was formed under the same conditions as the conditions of the first example except the widths p1 and p2 of the quadrangular-pyramid-shaped recesses in the non-exterior surface 22 in the directions perpendicular to the rib 2 and parallel to the rib 2, respectively, were both set to 5.0 mm and the maximum width M was set to 7.07 mm. The area ratio η of each quadrangular-pyramid-shaped recess was η=(0,0).

Twenty-Fourth Example

A document cover was formed under the same conditions as the conditions of the first example except the widths p1 and p2 of the quadrangular-pyramid-shaped recesses in the non-exterior surface 22 in the directions perpendicular to the rib 2 and parallel to the rib 2, respectively, were both set to 6.0 mm and the maximum width M was set to 8.4 mm. The area ratio η of each quadrangular-pyramid-shaped recess was 1'=(0,0).

Twenty-Fifth Example

A document cover was formed under the same conditions as the conditions of the first example except the widths p1 and p2 of the quadrangular-pyramid-shaped recesses in the non-exterior surface 22 in the directions perpendicular to the rib 2 and parallel to the rib 2, respectively, were both set to 0.07 mm and the maximum width M was set to 0.09 mm. The area ratio η of each quadrangular-pyramid-shaped recess was η=(0,0).

The results of the first and seventeenth to twenty-fifth examples and the first comparative example are shown in Table 6.

1.2 mm. The PV value was set to 0.1 mm. The width p2 of the recesses in the direction parallel to the rib 2 was set to 1.2 mm. Other conditions were the same as those of the first example. The area ratio η of each triangular-pyramid-shaped recess was η=(0,0).

Twenty-Seventh Example

In this example, a document cover was formed under the following conditions. That is, the pattern units of the repeated pattern of projections and/or recesses were formed of pentagonal-pyramid-shaped recesses. The width p1 of the recesses in the direction perpendicular to the rib 2 was set to 1.2 mm. The PV value was set to 0.1 mm. The width p2 of the recesses in the direction parallel to the rib 2 was set to 1.2 mm. Other conditions were the same as those of the first example. The area ratio η of each pentagonal-pyramid-shaped recess was η=(0,0).

Twenty-Eighth Example

In this example, a document cover was formed under the following conditions. That is, the pattern units of the repeated pattern of projections and/or recesses were formed of circular-cone-shaped recesses. The width p1 of the recesses in the direction perpendicular to the rib 2 was set to 1.2 mm. The PV value was set to 0.1 mm. The width p2 of the recesses in the direction parallel to the rib 2 was set to 1.2 mm. Other conditions were the same as those of the first example. The area ratio η of each circular-cone-shaped recess was η=(0,0).

The results of the first and twenty-sixth to twenty-eighth examples and the first comparative example are shown in Table 7.

TABLE 6

| | Shape of Projections/Recesses | Width p1 (Perpendicular) | Width p2 (Parallel) | Maximum Width M | Deviation | Evaluation Result |
|---|---|---|---|---|---|---|
| 1st Example | Quadrangular Pyramid (Recesses) | 1.2 mm | 1.2 mm | 1.69 mm | −13.1 | ○ |
| 17th Example | Quadrangular Pyramid (Recesses) | 0.4 mm | 0.4 mm | 0.56 mm | −14.1 | ○ |
| 18th Example | Quadrangular Pyramid (Recesses) | 0.8 mm | 0.8 mm | 1.13mm | −13.6 | ○ |
| 19th Example | Quadrangular Pyramid (Recesses) | 1.6 mm | 1.6 mm | 2.26 mm | −18.8 | ○ |
| 20th Example | Quadrangular Pyramid (Recesses) | 2.0 mm | 2.0 mm | 2.80 mm | −20.8 | ○ |
| 21st Example | Quadrangular Pyramid (Recesses) | 3.0 mm | 3.0 mm | 4.24 mm | −20.8 | ○ |
| 22nd Example | Quadrangular Pyramid (Recesses) | 4.0 mm | 4.0 mm | 5.65 mm | −21.2 | ○ |
| 23rd Example | Quadrangular Pyramid (Recesses) | 5.0 mm | 5.0 mm | 7.07 mm | −23.6 | ○ |
| 24th Example | Quadrangular Pyramid (Recesses) | 6.0 mm | 6.0 mm | 8.4 mm | −24.9 | Δ |
| 25th Example | Quadrangular Pyramid (Recesses) | 0.07 mm | 0.07 mm | 0.09 mm | −24.9 | Δ |
| 1st Comparative Example | Flat | — | — | — | −27.4 | X |

Twenty-Sixth Example

In this example, a document cover was formed under the following conditions. That is, the pattern units of the repeated pattern of projections and/or recesses were formed of triangular-pyramid-shaped recesses. The width p1 of the recesses in the direction perpendicular to the rib 2 was set to

TABLE 7

| | Shape of Projections/Recesses | Deviation | Evaluation Result |
|---|---|---|---|
| 1st Example | Quadrangular Pyramid (Recesses) | −13.1 | ○ |

TABLE 7-continued

| | Shape of Projections/Recesses | Deviation | Evaluation Result |
|---|---|---|---|
| 26th Example | Triangular Pyramid (Recesses) | −14 | ○ |
| 27th Example | Pentagonal Pyramid (Recesses) | −14.3 | ○ |
| 28th Example | Circular Cone (Recesses) | −13.5 | ○ |
| 1st Comparative Example | Flat | −27.4 | X |

Twenty-Ninth Example

In this example, a document cover was formed under the following conditions. That is, the pattern units of the repeated pattern of projections and/or recesses were formed of triangular columnar recesses. The width p1 of the recesses in the direction perpendicular to the rib 2 was set to 1.2 mm. The PV value was set to 0.1 mm. The width p2 of the recesses in the direction parallel to the rib 2 was set to 1.2 mm. The recesses in the repeated pattern were arranged next to each other along lines that are parallel to each other, and the adjacent lines were shifted from each other by 0.6 mm. Other conditions were the same as those of the first example. The area ratio η of each triangular columnar recess was η=(1,0).

Thirtieth Example

In this example, a document cover was formed under the following conditions. That is, the pattern units of the repeated pattern of projections and/or recesses were formed of quadrangular columnar recesses. The width p1 of the recesses in the direction perpendicular to the rib 2 was set to 1.2 mm. The PV value was set to 0.1 mm. The width p2 of the recesses in the direction parallel to the rib 2 was set to 1.2 mm. The recesses in the repeated pattern were arranged next to each other along lines that are parallel to each other, and the adjacent lines were shifted from each other by 0.6 mm. Other conditions were the same as those of the first example. The area ratio η of each quadrangular columnar recess was η=(1,0.5).

Thirty-First Example

In this example, a document cover was formed under the following conditions. That is, the pattern units of the repeated pattern of projections and/or recesses were formed of pentagonal columnar recesses. The width p1 of the recesses in the direction perpendicular to the rib 2 was set to 1.2 mm. The PV value was set to 0.1 mm. The width p2 of the recesses in the direction parallel to the rib 2 was set to 1.2 mm. The recesses in the repeated pattern were arranged next to each other along lines that are parallel to each other, and the adjacent lines were shifted from each other by 0.6 mm. Other conditions were the same as those of the first example. The area ratio η of each pentagonal columnar recess was η=(1,0.5).

Thirty-Second Example

In this example, a document cover was formed under the following conditions. That is, the pattern units of the repeated pattern of projections and/or recesses were formed of circular columnar recesses. The width p1 of the recesses in the direction perpendicular to the rib 2 was set to 1.2 mm. The PV value was set to 0.1 mm. The width p2 of the recesses in the direction parallel to the rib 2 was set to 1.2 mm. The recesses in the repeated pattern were arranged next to each other along lines that are parallel to each other, and the adjacent lines were shifted from each other by 0.6 mm. Other conditions were the same as those of the first example. The area ratio η of each circular columnar recess was η=(1,0.5).

Thirty-Third Example

In this example, a document cover was formed under the following conditions. That is, the pattern units of the repeated pattern of projections and/or recesses were formed of semicircular columnar recesses. The width p1 of the recesses in the direction perpendicular to the rib 2 was set to 0.2 mm. The PV value was set to 0.1 mm. The width p2 of the recesses in the direction parallel to the rib 2 was set to 0.2 mm. The recesses in the repeated pattern were arranged next to each other along lines that are adjacent and parallel to each other, and the adjacent lines were shifted from each other by 0.1 mm. Other conditions were the same as those of the first example. The area ratio η of each semicircular columnar recess was η=(1,0.57).

The results of the twenty-ninth to thirty-third examples and the first comparative example are shown in Table 8.

TABLE 8

| | Shape of Projections/Recesses | Deviation | Evaluation Result |
|---|---|---|---|
| 29th Example | Triangular Column (Recesses) | −15.5 | ○ |
| 30th Example | Quadrangular Column (Recesses) | −15.3 | ○ |
| 31st Example | Pentagonal Column (Recesses) | −14.9 | ○ |
| 32nd Example | Circular Column (Recesses) | −15.1 | ○ |
| 33rd Example | Semicircular Column (Recesses) | −16.6 | ○ |
| 1st Comparative Example | Flat | −27.4 | X |

Thirty-Fourth Example

In this example, a document cover was formed under the following conditions. That is, the pattern units of the repeated pattern of projections and/or recesses were formed of spherical-crown-shaped recesses. The width p1 of the recesses in the direction perpendicular to the rib 2 was set to 1.2 mm. The PV value was set to 0.1 mm. The width p2 of the recesses in the direction parallel to the rib 2 was set to 1.2 mm. Other conditions were the same as those of the first example. The area ratio η of each spherical-crown-shaped recess was η=(0.3,0.3).

Thirty-Fifth Example

In this example, a document cover was formed under the following conditions. That is, the pattern units of the repeated pattern of projections and/or recesses were formed of hemispherical recesses. The width p1 of the recesses in the direction perpendicular to the rib 2 was set to 0.2 mm. The PV value was set to 0.1 mm. The width p2 of the recesses in the direction parallel to the rib 2 was set to 0.2 mm. Other conditions were the same as those of the first example. The area ratio η of each hemispherical recess was η=(0.57,0.57).

The results of the thirty-fourth and thirty-fifth examples and the first comparative example are shown in Table 9.

TABLE 9

| | Shape of Projections/Recesses | Deviation | Evaluation Result |
|---|---|---|---|
| 34th Example | Spherical-Crown (Recesses) | −15.5 | ○ |
| 35th Example | Semispherical (Recesses) | −15.7 | ○ |
| 1st Comparative Example | Flat | −27.4 | X |

Thirty-Sixth Example

A document cover was formed under the same conditions as the conditions of the first example except quadrangular-pyramid-shaped recesses having curved side surfaces were formed in the non-exterior surface 22. The area ratio η of each quadrangular-pyramid-shaped recess having curved side surfaces was η=(−0.5,−0.5).

Thirty-Seventh Example

A document cover was formed under the same conditions as the conditions of the first example except quadrangular-pyramid-shaped recesses having side surfaces formed of two types of curved surfaces were formed in the non-exterior surface 22. The area ratio η of each quadrangular-pyramid-shaped recess having side surfaces formed of two types of curved surfaces was η=(−0.2,−0.2).

The results of the thirty-sixth and thirty-seventh examples and the first comparative example are shown in Table 10.

TABLE 10

| | Shape of Projections/ Recesses | Number of Types of Curved Surfaces | Deviation | Evaluation Result |
|---|---|---|---|---|
| 36th Example | Quadrangular Pyramid with Curved Sides | 1 | −18.2 | ○ |
| 37th Example | Quadrangular Pyramid with Curved Sides | 2 | −13.4 | ○ |
| 1st Comparative Example | Flat | — | −27.4 | X |

Thirty-Eighth Example

A document cover was formed under the same conditions as the conditions of the first example except a repeated pattern including quadrangular-pyramid-shaped projections and quadrangular-pyramid-shaped recesses was formed in the non-exterior surface 22 as the repeated pattern of projections and/or recesses. The area ratio η of each quadrangular-pyramid-shaped projection and each quadrangular-pyramid-shaped recess was η=(0,0).

Thirty-Ninth Example

A document cover was formed under the same conditions as the conditions of the first example except a repeated pattern including quadrangular-pyramid-shaped projections, quadrangular-pyramid-shaped recesses, and flat portions was formed in the non-exterior surface 22 as the repeated pattern of projections and/or recesses. The area ratio η of each quadrangular-pyramid-shaped projection and each quadrangular-pyramid-shaped recess was η=(0,0).

Fortieth Example

A document cover was formed under the same conditions as the conditions of the first example except a repeated pattern including quadrangular-pyramid-shaped projections and flat portions was formed in the non-exterior surface 22 as the repeated pattern of projections and/or recesses. The area ratio η of each quadrangular-pyramid-shaped projection was η=(0,0).

Forty-First Example

A document cover was formed under the same conditions as the conditions of the first example except a repeated pattern including quadrangular-pyramid-shaped recesses and flat portions was formed in the non-exterior surface 22 as the repeated pattern of projections and/or recesses. The area ratio η of each quadrangular-pyramid-shaped recess was η=(0,0).

The results of the thirty-eighth to forty-first examples and the first comparative example are shown in Table 11.

TABLE 11

| | Combination | Deviation | Evaluation Result |
|---|---|---|---|
| 38th Example | Projections + Recesses | −17.6 | ○ |
| 39th Example | Projections + Recesses + Flat Portions | −17.4 | ○ |
| 40th Example | Projections + Flat Portions | −17.5 | ○ |
| 41st Example | Recesses + Flat Portions | −17.2 | ○ |
| 1st Comparative Example | Flat | −27.4 | X |

Forty-Second Example

A document cover was formed under the same conditions as the conditions of the first example except two types of quadrangular-pyramid-shaped recesses were formed in the non-exterior surface 22. One type was quadrangular-pyramid-shaped recesses whose widths p1 and p2 in the directions perpendicular to the rib 2 and parallel to the rib 2, respectively, were both 1.2 mm. The other type was quadrangular-pyramid-shaped recesses whose widths p1 and p2 in the directions perpendicular to the rib 2 and parallel to the rib 2, respectively, were both 0.6 mm. The area ratio η was η=(0,0) for each of the two types of recesses.

Forty-Third Example

A document cover was formed under the same conditions as the conditions of the first example except two types of quadrangular-pyramid-shaped recesses were formed in the non-exterior surface 22. One type was quadrangular-pyramid-shaped recesses with a PV value of 0.1 mm. The other type was quadrangular-pyramid-shaped recesses with a PV value of 0.05 mm. The area ratio η was η=(0,0) for each of the two types of recesses.

The results of the forty-second and forty-third examples and the first comparative example are shown in Table 12.

TABLE 12

| | Recesses 1 | | Recesses 2 | | | Evaluation |
|---|---|---|---|---|---|---|
| | p1/p2 | PV Value | p1/p2 | PV Value | Deviation | Result |
| 42nd Example | 1.2 mm/1.2 mm | 0.1 mm | 0.6 mm/0.6 mm | 0.1 mm | −15.6 | ○ |
| 43rd Example | 1.2 mm/1.2 mm | 0.1 mm | 1.2 mm/1.2 mm | 0.05 mm | −13.9 | ○ |
| 1st Comparative Example | — | — | — | — | −27.4 | X |

Forty-Fourth Example

A document cover was formed under the same conditions as the conditions of the first example except projections on a texture face were formed as the repeated pattern of projections and/or recesses on the non-exterior surface 22, the depth of the texture pattern was set to 0.1 mm, and the maximum width M of the texture pattern was set to 1.2 mm. The area ratio η of each projection in the texture pattern was η=(0.5,0.5).

Forty-Fifth Example

A document cover was formed under the same conditions as the conditions of the forty-fourth example except the minimum distance between the texture pattern of the texture face formed on the non-exterior surface 22 and the rib 2 was set to 3.6 mm. The area ratio η of the texture pattern of the texture face was η=(0.5,0.5).

Forty-Sixth Example

A document cover was formed under the same conditions as the conditions of the forty-fourth example except the minimum distance between the texture pattern of the texture face formed on the non-exterior surface 22 and the rib 2 was set to 4.0 mm. The area ratio η of the texture pattern of the texture face was η=(0.5,0.5).

Forty-Seventh Example

A document cover was formed under the same conditions as the conditions of the forty-fourth example except the minimum and maximum distances between the texture pattern of the texture face formed on the non-exterior surface 22 and the rib 2 were set to 3.6 mm and 20 mm, respectively, and areas separated from the rib 2 by 20 mm or more were formed as flat surfaces without forming the texture face. The area ratio η of the texture pattern of the texture face was η=(0.5,0.5).

Forty-Eighth Example

A document cover was formed under the same conditions as the conditions of the forty-fourth example except the minimum distance between the texture pattern of the texture face formed on the non-exterior surface 22 and the rib 2 was set to 0 mm, and areas that are separated from the rib 2 by 20 mm or more were formed as flat surfaces without forming the texture face. The area ratio η of the texture pattern of the texture face was η=(0.5,0.5).

The results of the forty-fourth to forty-eighth examples and the first comparative example are shown in Table 13.

TABLE 13

| | Shape of Projections/ Recesses | Projection Start Position | Projection End Position | Deviation | Evaluation Result |
|---|---|---|---|---|---|
| 44th Example | Projections on Texture Face | 0 mm | End of Resin Molded Article | −18 | ○ |
| 45th Example | Projections on Texture Face | 3.6 mm | End of Resin Molded Article | −18.6 | ○ |
| 46th Example | Projections on Texture Face | 4.0 mm | End of Resin Molded Article | −24.8 | Δ |
| 47th Example | Projections on Texture Face | 3.6 mm | 20 mm | −18.3 | ○ |
| 48th Example | Projections on Texture Face | 0 mm | 20 mm | −17.8 | ○ |
| 1st Comparative Example | Flat | — | — | −27.4 | X |

Forty-Ninth Example

A document cover was formed under the same conditions as the conditions of the forty-fourth example except the maximum width M of the texture pattern of the texture face formed on the non-exterior surface 22 was set to 0.1 mm. The area ratio η of the texture pattern of the texture face was η=(0.5,0.5).

Fiftieth Example

A document cover was formed under the same conditions as the conditions of the forty-fourth example except the maximum width M of the texture pattern of the texture face formed on the non-exterior surface 22 was set to 0.4 mm. The area ratio η of the texture pattern of the texture face was η=(0.5,0.5).

Fifty-First Example

A document cover was formed under the same conditions as the conditions of the forty-fourth example except the maximum width M of the texture pattern of the texture face formed on the non-exterior surface 22 was set to 0.8 mm. The area ratio η of the texture pattern of the texture face was η=(0.5,0.5).

Fifty-Second Example

A document cover was formed under the same conditions as the conditions of the forty-fourth example except the maximum width M of the texture pattern of the texture face formed on the non-exterior surface 22 was set to 1.6 mm. The area ratio η of the texture pattern of the texture face was η=(0.5,0.5).

Fifty-Third Example

A document cover was formed under the same conditions as the conditions of the forty-fourth example except the maximum width M of the texture pattern of the texture face formed on the non-exterior surface 22 was set to 2.0 mm. The area ratio η of the texture pattern of the texture face was η=(0.5,0.5).

Fifty-Fourth Example

A document cover was formed under the same conditions as the conditions of the forty-fourth example except the maximum width M of the texture pattern of the texture face formed on the non-exterior surface 22 was set to 3.0 mm. The area ratio η of the texture pattern of the texture face was η=(0.5,0.5).

Fifty-Fifth Example

A document cover was formed under the same conditions as the conditions of the forty-fourth example except the maximum width M of the texture pattern of the texture face formed on the non-exterior surface 22 was set to 4.0 mm. The area ratio η of the texture pattern of the texture face was η=(0.5,0.5).

Fifty-Sixth Example

A document cover was formed under the same conditions as the conditions of the forty-fourth example except the maximum width M of the texture pattern of the texture face formed on the non-exterior surface 22 was set to 5.0 mm. The area ratio η of the texture pattern of the texture face was η=(0.5,0.5).

Fifty-Seventh Example

A document cover was formed under the same conditions as the conditions of the forty-fourth example except the maximum width M of the texture pattern of the texture face formed on the non-exterior surface 22 was set to 7.0 mm. The area ratio η of the texture pattern of the texture face was η=(0.5,0.5).

Fifty-Eighth Example

A document cover was formed under the same conditions as the conditions of the forty-fourth example except the maximum width M of the texture pattern of the texture face formed on the non-exterior surface 22 was set to 8.0 mm. The area ratio η of the texture pattern of the texture face was η=(0.5,0.5).

Fifty-Ninth Example

A document cover was formed under the same conditions as the conditions of the forty-fourth example except the maximum width M of the texture pattern of the texture face formed on the non-exterior surface 22 was set to 0.09 mm. The area ratio η of the texture pattern of the texture face was η=(0.5,0.5).

The results of the forty-fourth and forty-ninth to fifty ninth examples and the first comparative example are shown in Table 14.

TABLE 14

| | Shape of Projections/ Recesses | Maximum Width M | Deviation | Evaluation Result |
|---|---|---|---|---|
| 44th Example | Projections on Texture Face | 1.2 mm | −18 | ○ |
| 49th Example | Projections on Texture Face | 0.1 mm | −23.9 | ○ |
| 50th Example | Projections on Texture Face | 0.4 mm | −19.1 | ○ |
| 51st Example | Projections on Texture Face | 0.8 mm | −18.8 | ○ |
| 52nd Example | Projections on Texture Face | 1.6 mm | −18.2 | ○ |
| 53rd Example | Projections on Texture Face | 2.0 mm | −18.9 | ○ |
| 54th Example | Projections on Texture Face | 3.0 mm | −19.3 | ○ |
| 55th Example | Projections on Texture Face | 4.0 mm | −20.6 | ○ |
| 56th Example | Projections on Texture Face | 5.0 mm | −23.3 | ○ |
| 57th Example | Projections on Texture Face | 7.0 mm | −23.5 | ○ |
| 58th Example | Projections on Texture Face | 8.0 mm | −24.9 | Δ |
| 59th Example | Projections on Texture Face | 0.09 mm | −24.9 | Δ |
| 1st Comparative Example | Flat | — | −27.4 | X |

Sixtieth Example

A document cover was formed under the same conditions as the conditions of the first example except the thickness of the document cover was set to 2.0 mm, the thickness of the rib 2 (rib thickness) was set to 1.0 mm, and the widths p1 and p2 of the quadrangular-pyramid-shaped recesses in the non-exterior surface 22 in the directions perpendicular to the rib 2 and parallel to the rib 2, respectively, were both set to 1.2 mm. The area ratio η of each quadrangular-pyramid-shaped recess was η=(0,0).

Sixty-First Example

A document cover was formed under the same conditions as the conditions of the sixtieth example except the widths p1 and p2 of the quadrangular-pyramid-shaped recesses in the non-exterior surface 22 in the directions perpendicular to the rib 2 and parallel to the rib 2, respectively, were both set to 0.4 mm. The area ratio η of each quadrangular-pyramid-shaped recess was η=(0,0).

Sixty-Second Example

A document cover was formed under the same conditions as the conditions of the sixtieth example except the widths p1 and p2 of the quadrangular-pyramid-shaped recesses in the non-exterior surface 22 in the directions perpendicular to the rib 2 and parallel to the rib 2, respectively, were both set to 0.6 mm. The area ratio η of each quadrangular-pyramid-shaped recess was η=(0,0).

Sixty-Third Example

A document cover was formed under the same conditions as the conditions of the sixtieth example except the widths p1 and p2 of the quadrangular-pyramid-shaped recesses in the non-exterior surface 22 in the directions perpendicular to the rib 2 and parallel to the rib 2, respectively, were both set to 0.8 mm. The area ratio η of each quadrangular-pyramid-shaped recess was η=(0,0).

Sixty-Fourth Example

A document cover was formed under the same conditions as the conditions of the sixtieth example except the widths p1 and p2 of the quadrangular-pyramid-shaped recesses in the non-exterior surface 22 in the directions perpendicular to the rib 2 and parallel to the rib 2, respectively, were both set to 1.0 mm. The area ratio η of each quadrangular-pyramid-shaped recess was η=(0,0).

Sixty-Fifth Example

A document cover was formed under the same conditions as the conditions of the sixtieth example except the widths p1 and p2 of the quadrangular-pyramid-shaped recesses in the non-exterior surface 22 in the directions perpendicular to the rib 2 and parallel to the rib 2, respectively, were both set to 1.6 mm. The area ratio η of each quadrangular-pyramid-shaped recess was η=(0,0).

Sixty-Sixth Example

A document cover was formed under the same conditions as the conditions of the sixtieth example except the widths p1 and p2 of the quadrangular-pyramid-shaped recesses in the non-exterior surface 22 in the directions perpendicular to the rib 2 and parallel to the rib 2, respectively, were both set to 2.0 mm. The area ratio η of each quadrangular-pyramid-shaped recess was η=(0,0).

The results of the first, seventeenth to twenty-fifth, and sixtieth to sixty-sixth examples and the first comparative example are shown in Table 15.

TABLE 15

| | Shape of Projections/Recesses | Thickness/Rib Thickness | Width p1 (perpendicular) | Width p2 (parallel) | Maximum Width M | Deviation | Evaluation Result |
|---|---|---|---|---|---|---|---|
| 1st Example | Quadrangular Pyramid (Recesses) | 2.3 mm/1.2 mm | 1.2 mm | 1.2 mm | 1.69 mm | −13.1 | ○ |
| 17th Example | Quadrangular Pyramid (Recesses) | 2.3 mm/1.2 mm | 0.4 mm | 0.4 mm | 0.56 mm | −14.1 | ○ |
| 18th Example | Quadrangular Pyramid (Recesses) | 2.3 mm/1.2 mm | 0.8 mm | 0.8 mm | 1.13 mm | −13.6 | ○ |
| 19th Example | Quadrangular Pyramid (Recesses) | 2.3 mm/1.2 mm | 1.6 mm | 1.6 mm | 2.26 mm | −18.8 | ○ |
| 20th Example | Quadrangular Pyramid (Recesses) | 2.3 mm/1.2 mm | 2.0 mm | 2.0 mm | 2.80 mm | −20.8 | ○ |
| 21st Example | Quadrangular Pyramid (Recesses) | 2.3 mm/1.2 mm | 3.0 mm | 3.0 mm | 4.24 mm | −20.8 | ○ |
| 22nd Example | Quadrangular Pyramid (Recesses) | 2.3 mm/1.2 mm | 4.0 mm | 4.0 mm | 5.65 mm | −21.2 | ○ |
| 23rd Example | Quadrangular Pyramid (Recesses) | 2.3 mm/1.2 mm | 5.0 mm | 5.0 mm | 7.07 mm | −23.6 | ○ |
| 24th Example | Quadrangular Pyramid (Recesses) | 2.3 mm/1.2 mm | 6.0 mm | 6.0 mm | 8.4 mm | −24.8 | Δ |
| 25th Example | Quadrangular Pyramid (Recesses) | 2.3 mm/1.2 mm | 0.07 mm | 0.07 mm | 0.09 mm | −24.9 | Δ |
| 60th Example | Quadrangular Pyramid (Recesses) | 2.0 mm/1.0 mm | 1.2 mm | 1.2 mm | 1.69 mm | −14.8 | ○ |
| 61st Example | Quadrangular Pyramid (Recesses) | 2.0 mm/1.0 mm | 0.4 mm | 0.4 mm | 0.56 mm | −14.7 | ○ |
| 62nd Example | Quadrangular Pyramid (Recesses) | 2.0 mm/1.0 mm | 0.6 mm | 0.6 mm | 0.84 mm | −7.95 | ○ |
| 63rd Example | Quadrangular Pyramid (Recesses) | 2.0 mm/1.0 mm | 0.8 mm | 0.8 mm | 1.13 mm | −13.6 | ○ |
| 64th Example | Quadrangular Pyramid (Recesses) | 2.0 mm/1.0 mm | 1.0 mm | 1.0 mm | 1.41 mm | −11.9 | ○ |
| 65th Example | Quadrangular Pyramid (Recesses) | 2.0 mm/1.0 mm | 1.6 mm | 1.6 mm | 2.26 mm | −15 | ○ |
| 66th Example | Quadrangular Pyramid (Recesses) | 2.0 mm/1.0 mm | 2.0 mm | 2.0 mm | 2.80 mm | −15.6 | ○ |
| 1st Comparative Example | Flat | 2.3 mm/1.2 mm | — | — | — | −27.4 | X |

Sixty-Seventh Example

A document cover was formed under the same conditions as the conditions of the first example except the recesses had the shape illustrated in FIG. 18E and the area ratio η of each recess was 1'=(0.1,0.1).

The results of the first and sixty-seventh examples and the first comparative example are shown in Table 16.

TABLE 16

|  | Shape of Projections/ Recesses | Area Ratio η | Deviation | Evaluation Result |
|---|---|---|---|---|
| 1st Example | Quadrangular Pyramid (Recesses) | (0, 0) | −13.1 | ○ |
| 67th Example | Quadrangular Pyramid (Recesses) | (0.1, 0.1) | −14.1 | ○ |
| 1st Comparative Example | Flat |  | −25.3 | X |

As described above, the formation of non-uniform portions can be suppressed by forming the repeated pattern of projections and/or recesses.

The present invention may be applied to various types of resin molded articles that are required to have high-function surfaces without color differences. For example, the present invention may be applied to a document cover of a document reading device, a document cover of a multifunction printer including a document reading device, or a resin molded article required to have a dark colored design surface for use in a resin housing of various types of devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An injection molded article for an apparatus formed by a single type of molten resin being injected into a mold and a shape of the mold being transferred to the molded article, the molded article comprising:
an exterior surface having a glossy mirror face or a textured face configured for being an exteriorly exposed part of the apparatus without having an additional article or layer applied thereto the exterior surface;
a non-exterior surface configured generally parallel to the exterior surface; and
an outwardly projecting longitudinal wall portion formed on the non-exterior surface being oriented in a substantially perpendicular configuration to both the exterior surface and the non-exterior surface, the longitudinal wall having two opposing longitudinal sides configured parallel to each other, and a distal edge side interconnecting the opposing longitudinal sides,
wherein a thickness between the exterior surface and the non-exterior surface is less than or equal to 3 mm,
wherein the non-exterior surface includes at least a repeated pattern of projections and/or recesses other than the projecting longitudinal wall portion, a distance from top points of the projections and/or recesses to bottom points of the projections and/or recesses being in the range of 0.01 mm or more and 1 mm or less,
wherein a total surface area, with respect to the non-exterior surface, of the at least repeated pattern of projections and/or recesses is less than a total surface area of the entire non-exterior surface,
wherein the repeated pattern of projections and/or recesses are formed directly adjacent to and along a substantial length of at least one of the longitudinal sides of the longitudinal wall portion; and
wherein the projecting longitudinal wall portion is formed in a manner such that after a flow of the molten resin is disturbed by a repeated pattern formed on the mold for forming the repeated pattern of the non-exterior surface, the molten resin flows into a recess formed on the mold.

2. The injection molded article according to claim 1, wherein when a projection plane is an arbitrary plane including a perpendicular line dropped to the non-exterior surface from a peak point of each of the projections and/or recesses on the injection molded article, A is an area of a projection of a contour of each of the projections and/or recesses when the contour is projected onto the projection plane, and B is an area of a triangular reference projection formed by connecting three points, which are the peak point and two end points of each of the projections and/or recesses, an area ratio η is defined as η=(A−B)/B, and is in the range of −1<η≤1.

3. The injection molded article according to claim 1, wherein the projecting longitudinal wall portion forms at least one of a rib, a polygonal column, a circular column, and a sphere.

4. The injection molded article according to claim 1, wherein a maximum width of the projections and/or recesses on the non-exterior surface is in the range of 0.1 mm or more and 7.0 mm or less.

5. The injection molded article according to claim 1, wherein the projections and/or recesses have a polygonal pyramid shape, a circular cone shape, a polygonal columnar shape, a circular columnar shape, a spherical-crown shape, a hemispherical shape, or a cone shape with a curved side surface.

6. The injection molded article according to claim 5, wherein the projections and/or recesses have the cone shape with the curved side surface, and the curved side surface is formed of a single type of curved surface or two or more types of curved surfaces.

7. The injection molded article according to claim 5, wherein the projections and/or recesses in the repeated pattern are arranged along lines that are arranged adjacent and parallel to each other, and the adjacent lines are shifted from each other by a predetermined distance that is less than a maximum width of the projections and/or recesses on the non-exterior surface.

8. The injection molded article according to claim 5, wherein the repeated pattern of projections and/or recesses includes a combination of at least two of the projections, recesses, and flat portions.

9. The injection molded article according to claim 1, wherein the width of the projections and/or recesses is less than or equal to a width of the projecting portion on the exterior surface.

10. A method for manufacturing the injection molded article according to claim 1 by using a mold, the method comprising:
forming grooves in the mold by moving a V-shaped end mill, the grooves being used to form the projections and/or recesses.

11. A printing apparatus comprising:
a document cover, which is the injection molded article according to claim 1.

12. The injection molded article according to claim 1, wherein the exterior surface is black or dark in color.

13. The injection molded article according to claim 1, wherein the injection molded article comprises acrylonitrile butadiene-styrene (ABS), polycarbonate/acrylonitrile butadiene-styrene (PC/ABS), polystyrene (PS) or high impact polystyrene (HIPS).

14. The injection molded article according to claim 1, wherein the repeated pattern, formed on the mold, for forming the repeated pattern of the non-exterior surface has a polygonal pyramid shape formed by using a V-shaped end mill.

15. The injection molded article according to claim 1, wherein the repeated pattern, formed on the mold, for forming the repeated pattern of the non-exterior surface has a cone shape or a columnar shape formed by using two types of ball-end mills each having a different diameter.

16. The injection molded article according to claim 1, wherein the repeated pattern, formed on the mold, for forming the repeated pattern of the non-exterior surface is a texture pattern formed by etching, shot blasting, or sand blasting.

17. The injection molded article according to claim 1, wherein the projections and/or recesses are disposed directly adjacent to both sides of the longitudinal wall portion.

\* \* \* \* \*